(12) United States Patent
Yamaguchi

(10) Patent No.: US 8,149,360 B2
(45) Date of Patent: Apr. 3, 2012

(54) PROJECTION IMAGE DISPLAY APPARATUS

(75) Inventor: Yutaka Yamaguchi, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 93 days.

(21) Appl. No.: 12/844,232

(22) Filed: Jul. 27, 2010

(65) Prior Publication Data
US 2011/0025965 A1    Feb. 3, 2011

(30) Foreign Application Priority Data
Jul. 31, 2009    (JP) .................................. 2009-178899

(51) Int. Cl.
*G02F 1/1335*    (2006.01)
(52) U.S. Cl. ........ 349/118; 349/117; 349/119; 349/120; 349/121
(58) Field of Classification Search ........... 349/117–121
See application file for complete search history.

(56) References Cited

U.S. PATENT DOCUMENTS
5,327,270 A    7/1994    Miyatake
2006/0285042 A1    12/2006    Chen et al.

FOREIGN PATENT DOCUMENTS
JP    7-038050 B2    4/1995

*Primary Examiner* — Phu Vu
(74) *Attorney, Agent, or Firm* — Rossi, Kimms & McDowell LLP

(57) ABSTRACT

A projection image display apparatus includes: light source; polarization/separation element having a polarization/separation plane through which one polarized light passes and which reflects the other orthogonal to the one; an image display element for modulating the incident light into image light and reflecting the image light; and a retardation plate disposed between the polarization/separation element and the image display element: the retardation plate has refractive indices different between two orthogonal directions in an optical surface thereof, and gives phase difference larger than $\lambda/4$ to polarized light entering the optical surface and having a wavelength $\lambda$; and supposing z axis be a normal to a light entering/exiting surface of the polarization/separation element, y axis be perpendicular to z axis and a normal to the polarization/separation plane, and x axis be perpendicular to z- and y-axes, the first retardation plate has optic axis within xz plane and tilted to x axis.

15 Claims, 10 Drawing Sheets

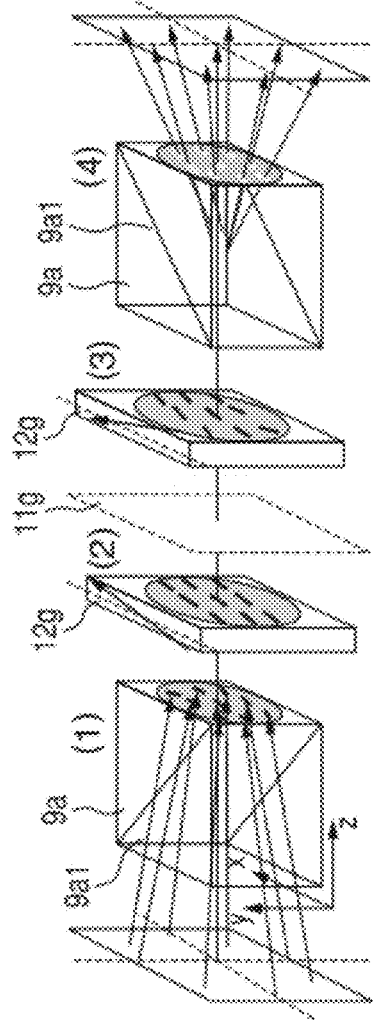
FIG. 3A
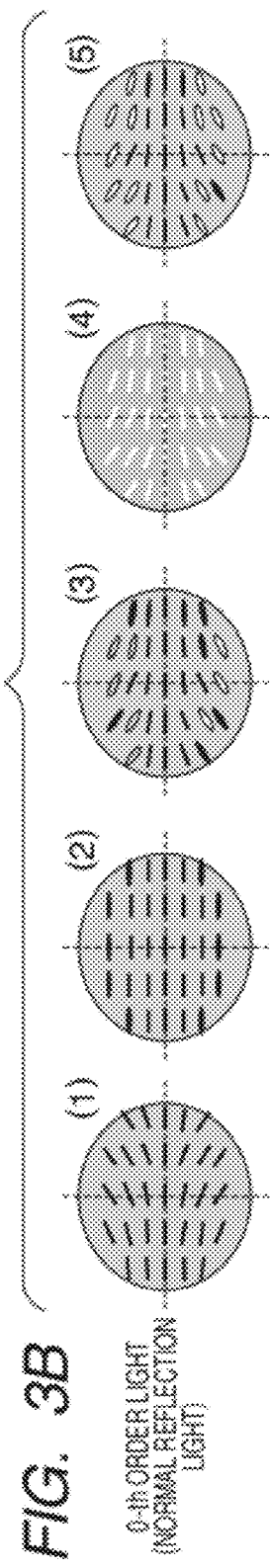
FIG. 3B 0-th ORDER LIGHT (NORMAL REFLECTION LIGHT)
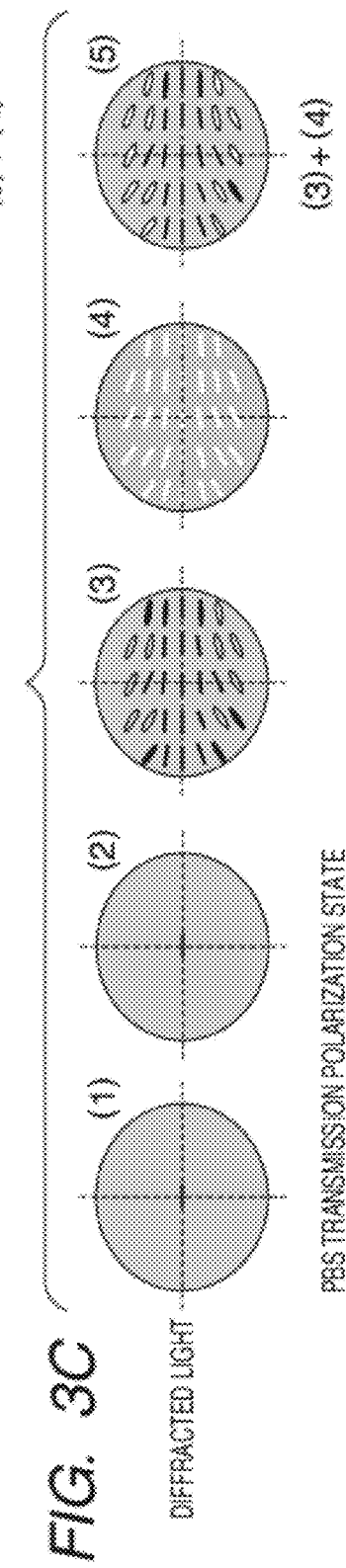
FIG. 3C DIFFRACTED LIGHT
PBS TRANSMISSION POLARIZATION STATE FIG. 5B 0-th ORDER LIGHT (NORMAL REFLECTION LIGHT)

FIG. 5C DIFFRACTED LIGHT 0-th ORDER LIGHT (NORMAL REFLECTION LIGHT)

DIFFRACTED LIGHT

PROJECTION IMAGE DISPLAY APPARATUS

BACKGROUND OF THE INVENTION

1. Field of the Invention

The present invention relates to an image display apparatus. More particularly, the present invention relates to a projection image display apparatus.

2. Description of the Related Art

Conventionally, there is known a projection image display apparatus which includes a light source, an optical system for separating illuminating light beams from the light source according to polarization and composing illuminating light beams, an image display element for converting the emitted light beams into image light beams, and a projecting optical system for forming an image with the converted image light beams.

In the following, a typical construction of a projection image display apparatus is described. White light emitted from the light source is arranged in a predetermined polarization state by a polarization conversion element, and is separated into green light and blue and red light by a dichroic mirror. Polarization directions of the blue and red light in predetermined wavelength bands are further rotated by 90 degrees by a color selection retardation plate, and light of a predetermined color illuminates an image display element corresponding to the predetermined color via a polarizing beam splitter (PBS) and a retardation plate. The image display element converts the illuminating light into image light according to an image signal and reflects the image light. The image light is composed by the polarizing beam splitter, a composition prism, and the like, and is projected onto a screen by a projecting optical system.

By the way, generally, in a projection image display apparatus, even when the image display element is in a black display state, leak light on a side of the projecting optical system lowers contrast of an image. Among elements included in an image display apparatus, a polarizing beam splitter and a retardation plate have polarization characteristics which depend on the incident angle, and thus, the characteristics of polarized light which passes through or is reflected by the element vary depending on the incident angle. In other words, phase shift is caused according to the incident angle. Therefore, the polarizing beam splitter may not uniformly polarize and separate all light, and part of the light becomes leak light.

Pixels of the image display element are arranged at regular intervals on the order of several micrometers. When incident light is reflected by the image display element, diffracted light according to the shape of an aperture is generated. The diffracted light is reflected at an angle which is different from that in the case of normal reflected light (0-th order reflected light) according to the order of diffraction thereof, and thus, optical characteristics of the reflected diffracted light received by a polarization element differs from those of normal reflected light received by the polarization element. As a result, a majority of the diffracted light is out of a desired polarization state and polarization and separation are not carried out enough, which is a factor to cause leak light.

Even when the image display element is in the black display state, such light is projected onto the screen via the polarizing beam splitter and a projection lens, which is a cause of the lowered contrast of the displayed image.

With respect to the above-mentioned problem, Japanese Patent Publication No. H07-038050 describes a method in which leak light is compensated for by disposing a ¼ wavelength plate between a polarizing beam splitter and a reflection type image display element. The incident light passes through the ¼ wavelength plate in a forward path and a backward path during reciprocating between the polarizing beam splitter and the reflection type image display element, so that leak light due to the dependence of the polarizing beam splitter on the incident angle is compensated for.

US 2006/0285042 A describes compensation for nonideal polarization effects of a polarizing beam splitter or a liquid crystal display element by disposing in an optical path a liquid crystal display element and a compensator having the optic axis which is tilted with respect to the liquid crystal display element.

In the method of compensating for the incident angle characteristics of the polarizing beam splitter by passing light through the ¼ wavelength plate in the forward path and the backward path, although light which is normally reflected (0-th order reflection) by the reflection type image display element may be compensated for, diffracted light may not be compensated for. Because diffracted light is reflected at an angle which is different from the incident angle, the angle of the incident light is different from the angle of the reflected light in the forward path and the backward path through the ¼ wavelength plate. Such light may not obtain the compensation effects by passing through the ¼ wavelength plate in the forward path and the backward path.

SUMMARY OF THE INVENTION

An object of the present invention is to provide a projection image display apparatus which enables high contrast by compensating for not only normal reflected light but also diffracted light generated by an image display element.

In order to attain the above-mentioned object, the present invention provides a projection image display apparatus including: a light source; a polarizing beam splitter having a polarizing beam splitting surface through which one polarized light in incident light passes and which reflects the other polarized light in the incident light which is orthogonal to the one polarized light; an image display element for modulating the incident light into image light and reflecting the image light; a retardation plate disposed between the polarizing beam splitter and the image display element; and a projection lens for projecting the image light onto a screen, in which: the retardation plate has refractive indices different from each other between two directions which are orthogonal to each other in an optical surface of the retardation plate, and gives a phase difference which is larger than $\lambda/4$ to polarized light which vertically enters the optical surface and has a designed wavelength $\lambda$ in a used wavelength band; and when coordinate axes are defined so that a direction of a normal to a light entering/exiting surface of the polarizing beam splitter is a z axis, a direction which is perpendicular both to the z axis and to a normal to the polarizing beam splitting surface is a y axis, and a direction which is perpendicular both to the z axis and to the y axis is an x axis, the retardation plate has an optic axis which is within an xz plane and is tilted with respect to the x axis.

According to the present invention, phase compensation may be provided for both normal reflected light and diffracted light generated by a polarizing beam splitter and an image display element to suppress leak light to a minimum, to thereby provide a projection image display apparatus which enables high contrast.

Further features of the present invention will become apparent from the following description of exemplary embodiments with reference to the attached drawings.

BRIEF DESCRIPTION OF THE DRAWINGS

FIGS. 3A, 3B and 3C are schematic views illustrating change in a polarization state of light which passes through the elements in Embodiment 1 of the present invention.

FIGS. 5A, 5B and 5C are schematic views illustrating change in a polarization state of light which passes through elements in a comparative example.

DESCRIPTION OF THE EMBODIMENTS

Exemplary embodiments of the present invention are described in detail in the following with reference to the attached drawings.

(Embodiment 1)

Figure 1:
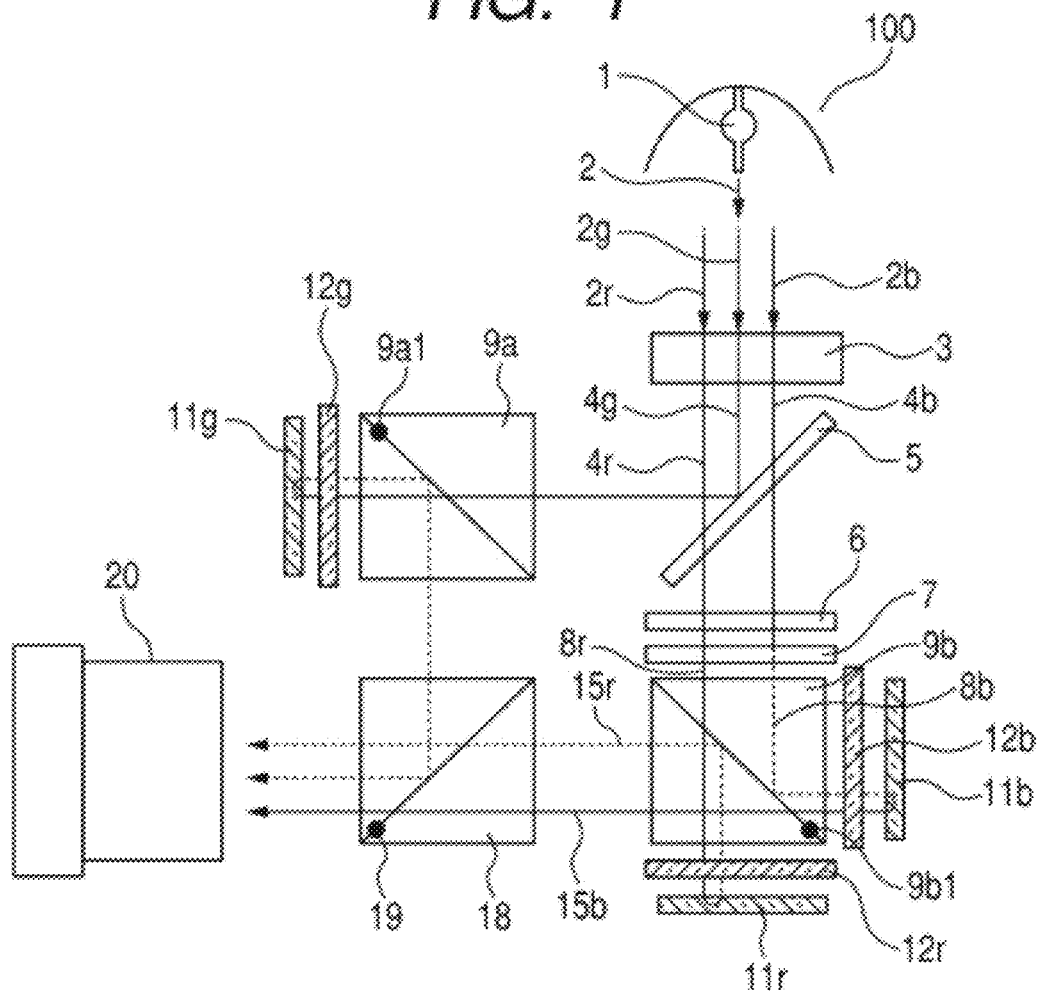
FIG. 1 is a schematic view illustrating a construction of a projection image display apparatus according to Embodiment 1 of the present invention.

FIG. 1 is a schematic view illustrating a construction of a projection image display apparatus 100 as Embodiment 1 of the present invention. The projection image display apparatus 100 includes a light source 1, a polarization conversion element 3, a dichroic mirror 5, a polarizing plate 6, a color selection retardation plate 7, a polarizing beam splitter 9a for green, a polarizing beam splitter 9b for blue and red, image display elements 11g, 11b, and 11r, retardation plates 12g, 12b, and 12r, a composition prism 18, and a projection lens optical system 20.

Light beams emitted from the light source 1 are reflected by a reflector to become substantially parallel light beams 2, and enter the polarization conversion element 3. In FIG. 1, the white parallel light beams 2 are separated into the three primary colors of green, blue, and red, which are designated as green light 2g, blue light 2b, and red light 2r, respectively. Although, for the sake of convenience, the green light, the blue light, and the red light are spatially separated from one another in FIG. 1, of course the light is not spatially separated at this stage. The green light, the blue light, and the red light are hereinafter referred to as G, B, and R, respectively.

The light of the respective colors emitted from the light source includes various kinds of polarized light, which are arranged in uniform polarization directions by being passed through the polarization conversion element 3 to become G polarized light 4g, B polarized light 4b, and R polarized light 4r and to enter the dichroic mirror 5. The dichroic mirror 5 reflects only light in the G band. By reflecting the G polarized light and transmitting the R polarized light and the B polarized light, the G polarized light is separated. The G polarized light enters the polarizing beam splitter 9a as it is, passes through the retardation plate 12g, and enters the image display element 11g for G.

The R polarized light and B polarized light which are separated enter the color selection retardation plate 7 after the degrees of polarization thereof are improved by being passed through the polarizing plate 6. The color selection retardation plate 7 rotates the polarization direction of only the B polarized light by 90 degrees. While the polarization state of the R polarized light remains the same, the polarization direction of the B polarized light is rotated by 90 degrees, and the two enter the polarizing beam splitter 9b. The polarizing beam splitters 9a and 9b are elements which transmit one polarized light that enters the polarizing beam splitting surface 9a1 or 9b1 and reflect the other polarized light that is orthogonal to the one polarized light. Elements which act in this way include elements, for example, formed by laminating on the polarizing beam splitting surfaces 9a1 and 9b1 thin films which have different refractive indices. The polarizing beam splitting surface 9b1 of the polarizing beam splitter 9b reflects the B polarized light and transmits the R polarized light to achieve the separation. The B polarized light and the R polarized light pass through the retardation plates 12b and 12r and enter the image display elements 11b and 11r which correspond to the colors, respectively.

The polarization directions of the illuminating light which enters the image display elements 11b, 11r, and 11g are rotated by 90 degrees with respect to the respective pixels according to an image signal. The illuminating light is converted into image light by being modulated and reflected. The B image light and the R image light again pass through the retardation plates 12b and 12r, respectively, and then, again enter the polarizing beam splitter 9b. Here, the B-polarized image light passes through the polarizing beam splitting surface 9b1 to be blue light 15b while the R-polarized image light is reflected by the polarizing beam splitting surface 9b1 to be red light 15r. The blue light 15b and red light 15r are emitted from the polarizing beam splitter 9b to make a composition. The G-polarized image light passes through the retardation plate 12g, and then, is reflected by the polarizing beam splitting surface 9a1 of the polarizing beam splitter 9a to enter the composition prism 18. The G image light is reflected by a dichroic film 19 in the composition prism while the B light 15b and R light 15r pass through the dichroic film 19. The G light, the R light, and the B light are composed in this way to be emitted. The composed image light is projected onto a screen by the projection lens optical system 20 to form an image.

In the projection image display apparatus according to the present invention, the retardation plates 12g, 12b, and 12r have different refractive indices with respect to two directions which are orthogonal to each other in an optical surface, and have phase differences which are equal to or larger than $\lambda/4$, more preferably on the order of $\lambda/2$, where $\lambda$ is a designed wavelength in the respective used wavelength bands. Here, a used wavelength band refers to a main wavelength band of polarized light which is transmitted or reflected along each optical path, and depends on the characteristics and construction of the projection image display apparatus. In this embodiment, the used wavelength bands of a B optical path, a G optical path, and an R optical path are, for example, on the order of 420 to 480 nm, on the order of 500 to 580 nm, and on the order of 600 to 680 nm, respectively, but the present invention is not limited thereto. Further, the designed wavelength $\lambda$ is a wavelength which is used in determining a phase difference of a retardation plate such as a ¼ wavelength plate and a ½ wavelength plate. While depending on the spectrum of the light source, the designed wavelength $\lambda$ is normally in the used wavelength band and is selected from around the center thereof. Although, in the present invention, the designed wavelengths with respect to the B optical path, the G optical path, and the R optical path are 450 nm, 550 nm, and 630 nm, respectively, the present invention is not limited thereto.

Figure 2:
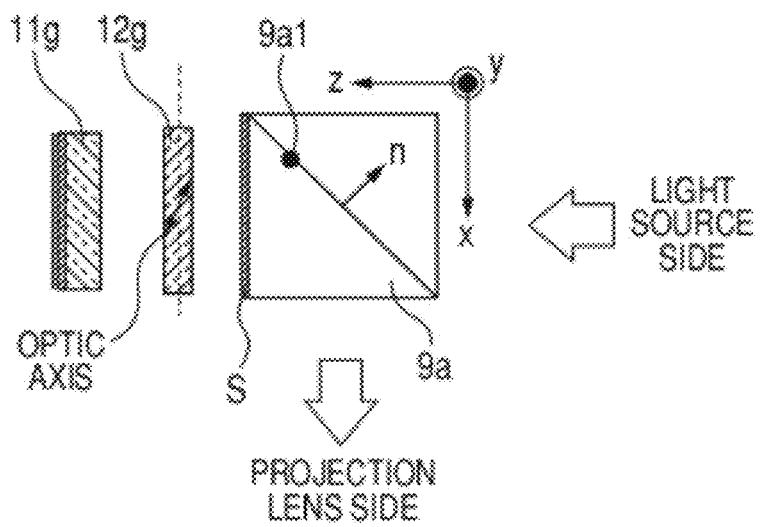
FIG. 2 is a schematic view illustrating disposition of elements in an optical path of green light of the projection image display apparatus according to Embodiment 1.

FIG. 2 is an enlarged view illustrating disposition of the elements in the G optical path of FIG. 1. An overview of the present invention is described in the following with the G optical path taken as an example, but the description is not limited to the G optical path and the same description is applicable to the R optical path and the B optical path.

First, three-dimensional coordinate axes x, y, and z illustrated in FIG. 2 are defined as in the following. Let the direction of a normal to a light entering/exiting surface S of the polarizing beam splitter 9a from/to the image display element 11g be z axis, let the direction which is perpendicular both to a normal n to the polarizing beam splitting surface 9a1 of the polarizing beam splitter 9a and to z axis be y axis, and let the direction which is perpendicular both to y and to z axes be x axis. The optic axis of the retardation plate 12g is in a plane which is in parallel both to the normal n to the polarizing beam splitting surface and to the z axis (in xz plane) and, at the same time, is disposed so as to be tilted with respect to the light entering/exiting surface S of the polarizing beam splitter 9a (xy plane). In other words, the optic axis of the retardation plate 12g is disposed so as to be tilted about the y axis from a state in parallel to the x axis.

Next, a methodology and effects of phase compensation according to the present invention are described.

FIG. 3A schematically illustrates incident light in the element construction of Embodiment 1 in FIG. 2 which passes through the polarizing beam splitter 9a, the retardation plate 12g, and the image display element 11g in a forward path and a backward path until being polarized and separated again by the polarizing beam splitter 9a. Steps after the light is reflected by the image display element 11g are horizontally flipped so as to be mirror symmetrical with respect to the image display element 11g, and the schematic drawing is made in a manner that the light beam pass through the respective elements. FIGS. 3B and 3C illustrate difference in the polarization state with respect to the incident angles of light passing through the elements. Black lines in gray ellipses illustrated in parts (1) to (5) of FIGS. 3B and 3C designate polarization states represented as ellipses with respect to certain incident angles and certain incident azimuth. An incident angle herein referred to is defined as an angle formed with the z axis while an incident azimuth herein referred to is defined as an angle formed by an image of incident light projected onto the xy plane and the x axis. In FIGS. 3A to 3C, light beams which enter in parallel with the z axis are illustrated at the centers of the gray ellipses. The distance from the center of a gray ellipse to a point in the gray ellipse represents the incident angle at the point while the direction from the center of the gray ellipse to a point in the gray ellipse represents the incident azimuth at the point. The further from the center of the gray ellipse the position goes, the higher the polarization state represented by the shape is of a light beam the incident angle. Parts (1) to (4) of FIG. 3B illustrate polarization states of light which is normally reflected by the image display element 11g while parts (1) to (4) of FIG. 3C illustrate polarization states of light which vertically enters the image display element 11g and is diffracted when being reflected by the image display element. FIG. 3C illustrates change in the polarization state when the direction of travelling of the light differs between a case in which the light enters the image display element 11g (vertical entrance) and a case in which the light is reflected (reflected in oblique direction) due to diffraction by the image display element 11g. Parts (1) of FIGS. 3B and 3C illustrate angle distributions of polarization states of light immediately after the incident light enters the polarizing beam splitter 9a. Parts (2) of FIGS. 3B and 3C illustrate polarization states thereafter when the light has passed through the retardation plate 12g. Parts (3) of FIGS. 3B and 3C illustrate polarization states when the light is further reflected by the image display element 11g and again passes through the retardation plate 12g. Parts (4) of FIGS. 3B and 3C illustrate ideal polarization states represented by white lines when the light is again analyzed by the polarizing beam splitter 9a. Parts (5) of FIGS. 3B and 3C are superposition of parts (3) and (4). Eventually, as the amount of displacement between a black line and a white line in part (5) becomes larger, the amount of displacement between the final polarization state of light and the direction analyzed by the polarizing beam splitter 9a becomes larger, which means that the amount of leak light is large.

First, the dependence of the polarizing beam splitter 9a on the incident angle is described. The polarized light separated by the polarizing beam splitter 9a illustrated in FIG. 3A has asymmetrical characteristics with respect to the incident angle. For example, when the polarizing beam splitter 9a is a MacNeille type PBS which transmits P polarized light and reflects S polarized light, the directions of the P polarized light and the S polarized light depend on the incident angles and the incident azimuths at which the P polarized light and the S polarized light enter the polarizing beam splitting surface 9a1, respectively. The difference in the polarization state depending on the incident angle and the incident azimuth may be illustrated as part (1) of FIG. 3B. Here, the distribution of the polarization states is symmetrical with respect to the x axis but is asymmetrical with respect to the y axis. Such symmetry is determined by the symmetry of the angle distribution of light which enters the polarizing beam splitting surface 9a1.

Figure 4A:
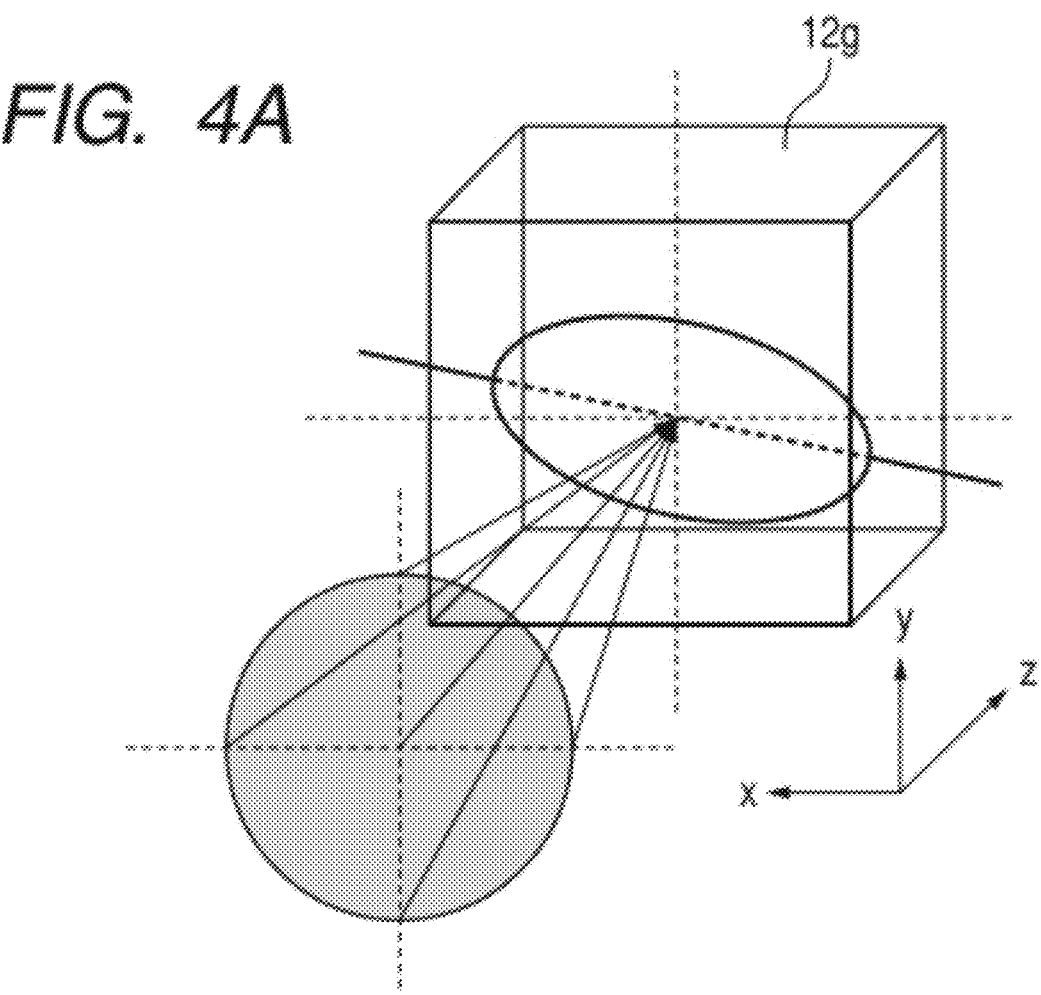
FIGS. 4A and 4B are schematic views for describing the change in the polarization state of light which enters a retardation plate having an optic axis which is tilted.
Figure 4B:
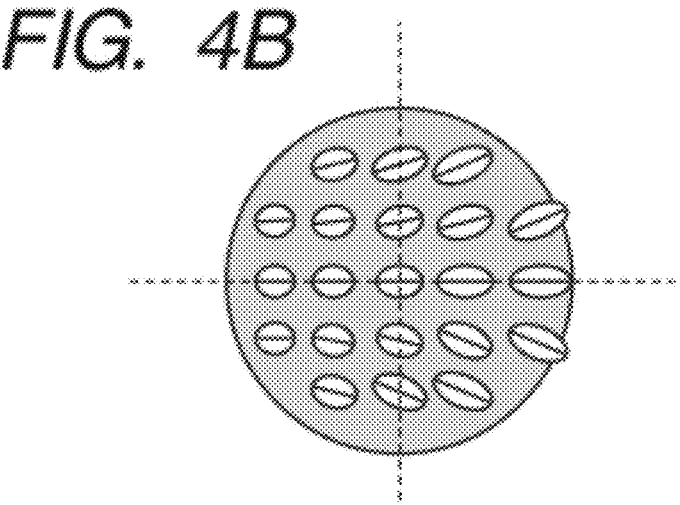

Next, effects of the retardation plate 12g with respect to the above-mentioned polarization distribution are described. The optic axis of the retardation plate 12g according to the present invention is, as illustrated in FIG. 2, disposed so as to be tilted about the y axis in the figure from a state in parallel with the x axis. By tilting the optic axis about the y axis, polarized light beams which enter at respective incident angles and respective incident azimuths are subject to phase differences which are symmetrical with respect to the x axis but are asymmetrical with respect to the y axis. More specifically, first, depending on the incident angle and incident azimuth at which the polarized light enters, the direction of a slow axis (fast axis) of the retardation plate 12g with respect to the polarized light is tilted asymmetrically. FIGS. 4A and 4B describe the phase difference to which the polarized light that enters the retardation plate 12g having the tilted optic axis is subject. In the retardation plate 12g of FIG. 4A, the refractive index anisotropy of the retardation plate 12g is represented as an ellipse, which is referred to as a refractive index ellipse. In the retardation plate 12g according to the present invention, the major axis of the refractive index ellipse which is in parallel with the optic axis is in the xz plane, and, at the same time, is tilted with respect to the xy plane (x axis). The phase difference to which the polarized light that enters the retardation plate 12g is subject is determined by the axial direction (fast axis or slow axis) of a section of the ellipse and the difference between the major axis length and the minor axis length thereof (the refractive index anisotropy). The section of the ellipse is a section in a plane which is perpendicular to the direction in which the polarized light that enters the retardation plate 12g travels. FIG. 4B schematically illustrates sections of the ellipse when light beams enter the retardation plate 12g at respective incident angles and respective incident azimuths. The axial direction of the section of the ellipse is tilted symmetrically with respect to the x axis but asymmetrically with respect to the y axis. The polarized light beams which enter at respective incident angles and respective incident azimuths and pass through the retardation plate 12g are subject to the phase difference according to the asymmetry. If the phase difference which is asymmetrical with respect to the y axis caused at the upstream polarizing beam splitter 9a and the phase difference which is asymmetrical with respect to the y axis caused at the retardation plate 12g are complementary to each other, the asymmetry is compensated for (cancelled out). For example, when linear polarized light having a distribution as illustrated in part (1) of FIG. 3B enters the retardation plate 12g which has a phase difference on the order of ½ wavelength and the optic axis tilted as illustrated in FIG. 4A, the polarized light illustrated in part (1) of FIG. 3B is subject to a phase difference such that the polarization direction is reversed with the major axis of the ellipse in FIG. 4B being the axis of the reversal. By appropriately selecting the tilt angle of the axis of the ellipse of FIG. 4B, the oscillation direction of the polarized light which passes through the retardation plate 12g is in parallel with the x axis (polarization state is as illustrated in part (2) of FIG. 3B). More specifically, the dependence of the polarizing beam splitter 9a on the incident angle is compensated for in the forward optical path. Even when the light is reflected by the image display element 11g and the incident angle distribution is flipped, because the symmetrical relationship between the retardation plate 12g and the polarizing beam splitter 9a is maintained, displacement with respect to the polarization direction of the polarizing beam splitter 9a is finally compensated for as illustrated in part (4) of FIG. 3B, to thereby decrease leak light of the normal reflected light.

According to the present invention, the displacement of the polarization state due to the angle distribution of the polarizing beam splitter may be compensated for not both in the forward optical path and the backward optical path but only in a one-way optical path. Therefore, compensating effects which are comparable to those with respect to normal reflected light may be obtained even with respect to diffracted light having the incident angle in the forward path different from the incident angle in the backward path. Parts (1) to (5) of FIG. 3C are schematic views illustrating the behavior of the diffracted light. For example, polarized light which vertically enters the image display element 11g (part (1) of FIG. 3C) is not affected by the retardation plate 12g in the forward path as illustrated in part (2) of FIG. 3C, and is subject to the phase difference of the retardation plate 12g according to the diffraction angle only in the backward path. The polarized light diffracted by the image display element 11g is, after passing through the retardation plate 12g, as illustrated in part (3) of FIG. 3C, subject to compensation so as to be in a polarization state thereof which is appropriate for the polarized light beam to be polarized and separated by the polarizing beam splitter 9a. As a result, as illustrated in part (5) of FIG. 3C, the polarization state at the time of emission conforms to the polarization direction of the light separated by the polarizing beam splitter, and leak light of the diffracted light is decreased. In this way, if the leak light due to the polarizing beam splitter is compensated for in the one-way optical path, phase compensation may be provided with respect to both normal reflected light and diffracted light, to thereby realizing that leak light may be suppressed more and high contrast may be attained. Further, manufacturing fluctuations of the image display element or the like may vary the strength of the diffracted light, which affects the contrast of the apparatus as a whole. However, since the leak light of the diffracted light is suppressed to be small to thereby suppress the variation in the contrast to relax tolerance of the manufacturing fluctuations, the cost of manufacturing of the apparatus can be reduced as a whole.

Figure 5A:
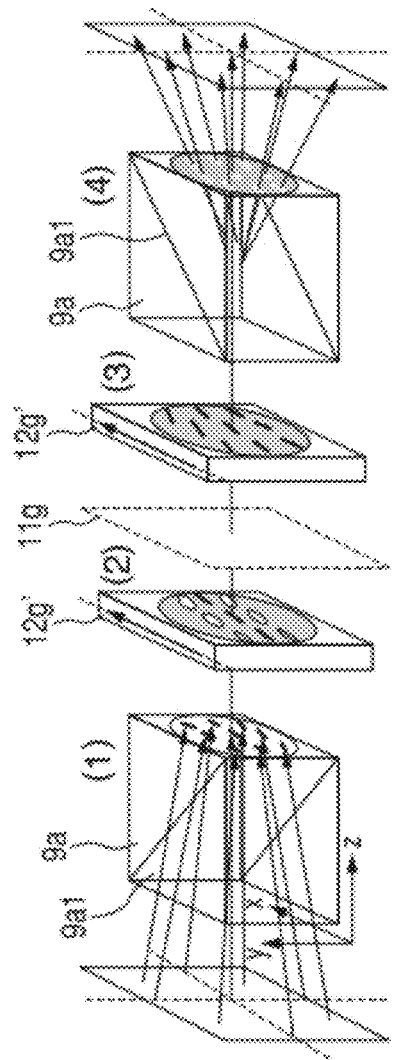
Figure 5A:
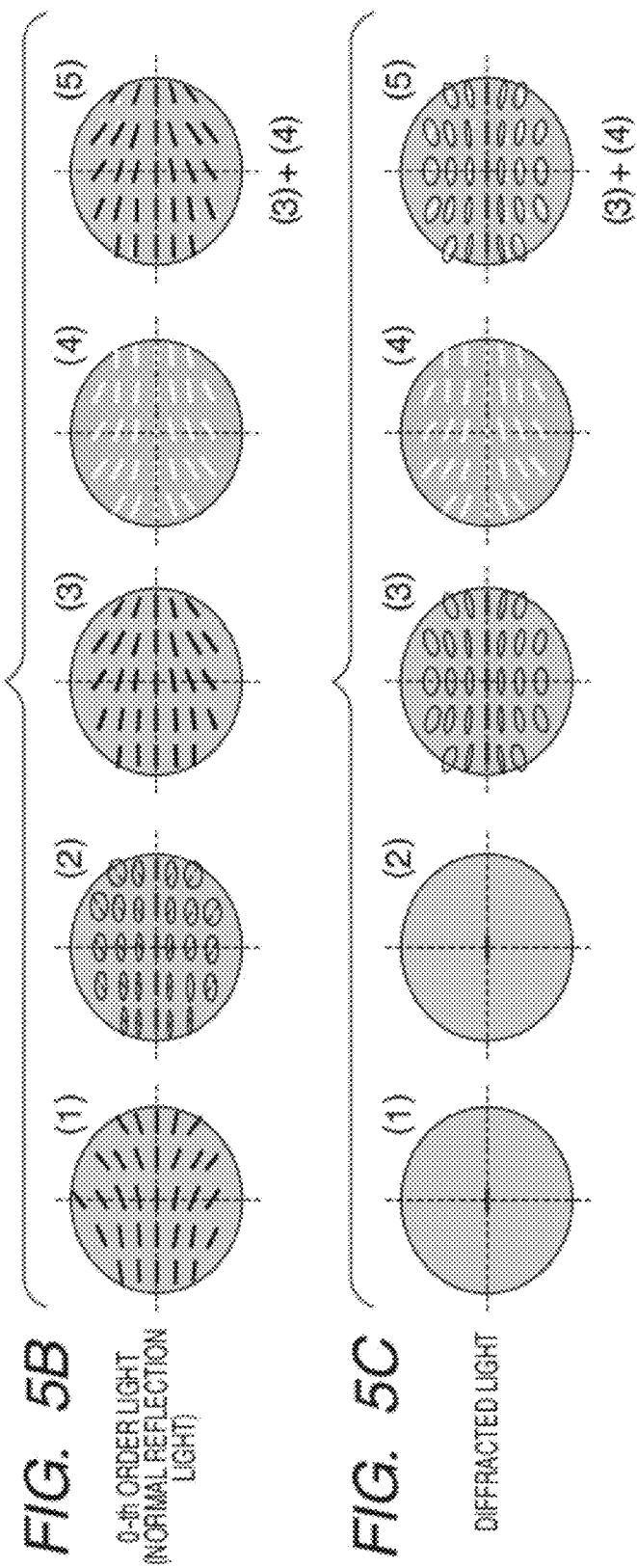

For the purpose of describing a conventional method of compensation, FIG. 5A schematically illustrates a case where a retardation plate 12g' (retardation plate in the comparative example is denoted as 12g') is a ¼ wavelength plate and the optic axis thereof is disposed substantially in parallel with the y axis, and FIGS. 5B and 5C illustrate angle distributions of polarization states of normal reflected light and diffracted light, respectively. General description of FIGS. 5A to 5C is substantially similar to that of FIGS. 3A to 3C, and thus, is omitted. In FIG. 5B, first, change in the polarization state of the normal reflected light is considered. By passing through the ¼ wavelength plate 12g' once from the state illustrated in part (1) of FIG. 5B, the polarization state of the light illustrated in part (2) of FIG. 5B is elliptically polarized light which depends on the incident angle. By passing through the ¼ wavelength plate 12g' again after reflecting the light by the image display element 11g, a phase difference which corresponds to around ½ wavelength is given in the forward path and the backward path, and the polarization state is flipped with respect to the x axis (or y axis) as illustrated in part (3) of FIG. 5B. As a result, the state of the emitted polarized light and the polarization direction of the polarizing beam splitter 9a become the same, and leak light is decreased with respect to a normal reflected light component. However, displacement is arisen with respect to incident light in a diagonal direction shown in part (3) of FIG. 5B, especially at a high incident angle. This is because displacement which is asymmetrically arisen with respect to the y axis may not be completely compensated for only by flipping the polarizing axis with respect to the x axis or the y axis by making the light pass through the ¼ wavelength plate in the forward path and the backward path.

Figure 6A:
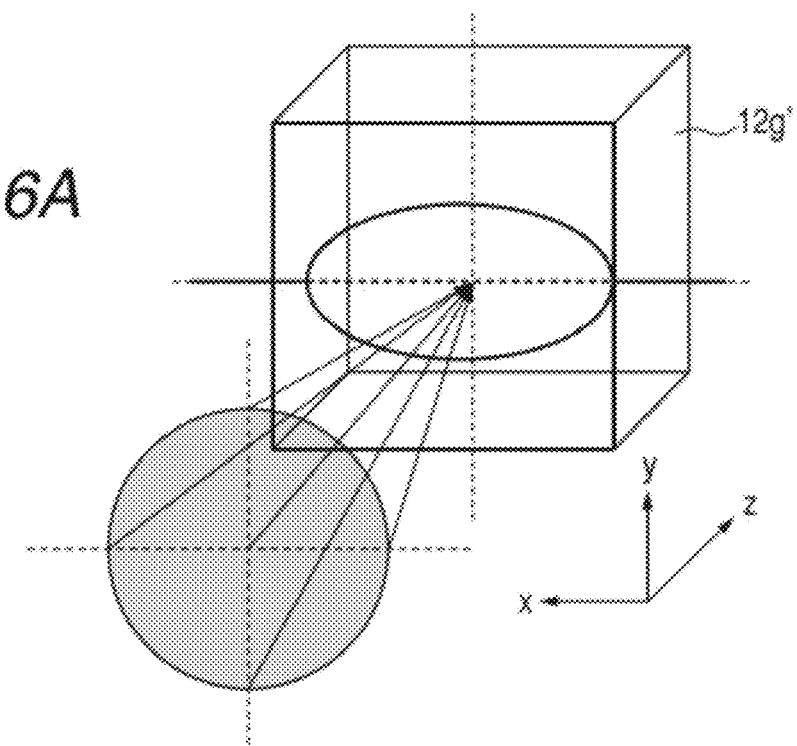
FIGS. 6A and 6B are schematic views for describing the change in the polarization state of light which enters a retardation plate having an optic axis which is parallelly disposed.
Figure 6B:
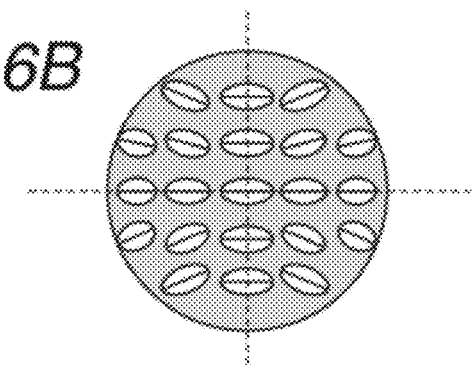

Next, change in the polarization state of the diffracted light is considered. As illustrated in parts (1) to (5) of FIG. 5C, in the forward path, the incident light vertically enters the image display element (and therefore, is not subject to the phase difference of the ¼ wavelength plate 12g') and is subject to the phase difference of the ¼ wavelength plate 12g' according to the diffraction angle only in the backward path. FIGS. 6A and 6B describe the phase difference caused by the ¼ wavelength plate 12g' having the optic axis in parallel with the x axis (or y axis). Detailed description of FIGS. 6A and 6B is the same as that of FIGS. 4A and 4B, and thus, is omitted. As illustrated in FIG. 6A, in the retardation plate 12g' of the comparative example, the major axis of the refractive index ellipse is parallel to the x axis. When the optic axis is substantially parallel to the x axis (or y axis), the distribution of the phase differences, which are arisen in the polarized light beams that enters at respective incident angles and respective incident azimuths by the ¼ wavelength plate 12g', is symmetrical with respect to the x axis or the y axis. FIG. 6B illustrates the distribution of sections of the refractive index ellipses with respect to polarized light beams which enter at respective incident angles and respective incident azimuths. The distribution is symmetrical with respect to the x axis and the y axis. Because the phase difference is approximately ¼ wavelength, linear polarized light which obliquely enters the retardation plate 12g' becomes elliptically polarized light, and the polarization state of the light which passes through the retardation plate 12g' is as illustrated in part (3) of FIG. 5C. In this way, according to the conventional method of compensation, diffracted light passes through the ¼ wavelength plate 12g' once to become elliptically polarized light, which again enters the polarizing beam splitter. As is clear from part (5) of FIG. 5C, which is the superposition of part (3) of FIG. 5C that illustrates the final polarization state and part (4) of FIG. 5C that is an ideal polarization state to be analyzed by the polarizing beam splitter, the final polarization state and the ideal polarization state are not coincident to each other, as a result, much of the diffracted light becomes leak light.

Figure 7:
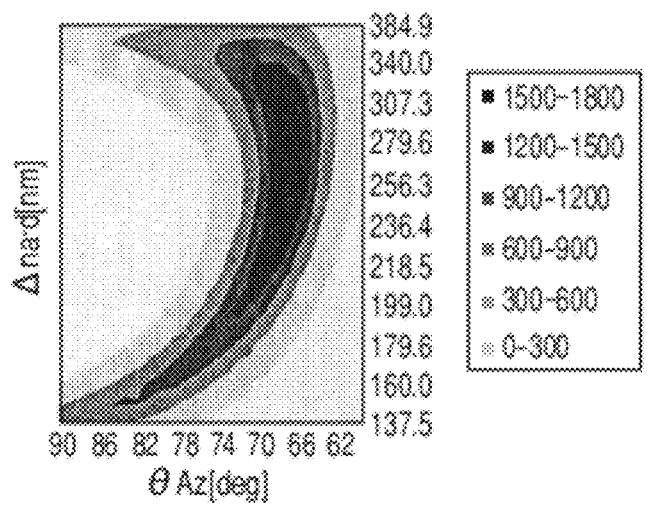
FIG. 7 illustrates correlation among a phase difference and a tilt angle of the retardation plate according to Embodiment 1 and contrast.

FIG. 7 illustrates the result of calculation of the contrast with respect to the phase difference and the tilt angle of the optic axis of the retardation plate 12g in the G optical path of Embodiment 1 including diffracted light. The horizontal axis represents a tilt angle θAz of the optic axis of the retardation plate with respect to the z axis, while the vertical axis represents a phase difference Δna×d of the retardation plate. As the tone becomes darker, the contrast becomes higher. When a ¼ wavelength plate (the phase difference is 137.5 nm when the wavelength λ is 550 nm) is used, while the contrast is 750:1 at the lower-left corner of the graph of FIG. 7 (90 deg. and 137.5 nm), a contrast of 1600:1 may be attained when the parameters of the retardation plate are 67 deg. and 275 nm.

In the projection image display apparatus of the present invention, because the phase compensating effects may not be obtained when the phase difference is λ/4 or smaller, it is preferred to use a retardation plate having the phase difference of larger than λ/4. Further, a phase difference R which is arisen when the light in parallel with the z axis enters and passes through the retardation plate 12g is preferred to be 0.3λ or larger and 0.7λ or smaller, and more preferred to be 0.4λ or larger and 0.6λ or smaller, where λ is the designed wavelength. A phase difference R is expressed as follows, $$R = \Delta na \times d,$$

where d is the length of a path along which light that enters in parallel with the z axis passes through an anisotropic medium of the retardation plate and Δna is the difference in the refractive index between two polarized light beams which enter in parallel with the z axis and are orthogonal to each other.

Therefore, it is preferred that the following expression be satisfied.

$$0.3\lambda \leq \Delta na \times d \leq 0.7\lambda \tag{1}$$

Further, it is more preferred that the following expression be satisfied.

$$0.4\lambda \leq \Delta na \times d \leq 0.6\lambda \tag{1'}$$

At the same time, it is preferred that the following expression be satisfied, $$60 \leq \theta Az \leq 85, \tag{2}$$

where θAz (degree) is the angle formed between the optic axis of the retardation plate and the z axis (acute angle). Further, it is more preferred that the following expression be satisfied.

$$62 \leq \theta Az \leq 70 \tag{2'}$$

When θAz is larger than 85 degrees, the optic axis is substantially in parallel with the xy plane. Because the asymmetry of the phase difference with respect to the tilt of the incident light from the direction of the z axis toward the direction of the x axis is not sufficiently caused, the effects of the present invention are difficult to obtain. When θAz is smaller than 60 degrees, the asymmetry caused by the retardation plate is increased resulting in overcompensation, and the effects of the present invention are difficult to obtain.

When Expressions (1) and (2) are not satisfied simultaneously, the great phase compensating effects of the present invention may not be obtained. Further, it goes without saying that a retardation plate having a higher-order phase difference attained by adding to the phase difference expressed by the above-mentioned expressions a phase difference of a half integral multiple of the designed wavelength λ may obtain the effects of the present invention. However, taking into consideration the increase in sensitivity and dependence on the wavelength when the elements are disposed, it is preferred that the retardation plate be a lower-order retardation plate, and it is more preferred that the retardation plate be a 0-th order retardation plate.

Table 1 shows the characteristics of the retardation plates in the respective optical paths in Embodiment 1 of the present invention. The phase difference (Δna×d) of the retardation plate of the present invention is 0.5λ with respect to all the optical paths where λ is the designed wavelength, which satisfies Expression (1). θAx represents the angle formed between the image of the optic axis of the retardation plate projected onto the xy plane and the x axis (azimuth of optic axis). With respect to the retardation plate of Embodiment 1, θAz is set to 67 to 68 degrees, which satisfies Expression (2), and θAx is 0 degree, which means that the image of the optic axis of the retardation plate projected onto the xy plane is disposed in parallel with the x axis.

The retardation plate having such characteristics may be formed by, for example, obliquely cutting out an anisotropic crystal such as sapphire. Alternatively, a drawn film, a film using liquid crystal orientation, or a film having structural anisotropy obtained by oblique vapor deposition may be used, or, a retardation plate using structural anisotropy of a fine periodic structure of the size of the wavelength or smaller may also be used. In the case of a high-luminance projection image display apparatus, the retardation plate which is of a type in which a crystal is cut out or which uses structural anisotropy of a fine periodic structure is more preferred because the retardation plate can be formed only of an inorganic material. A retardation plate formed only of an inorganic material is a retardation plate which is excellent in heat resistance and UV resistance, and therefore, is highly reliable. As the polarizing beam splitter 9a, a MacNeille type PBS which is formed by laminating an inorganic dielectric thin film as the polarizing beam splitting surface 9a1 on an interface of such a prism is preferred.

(Embodiment 2)

Figure 8:
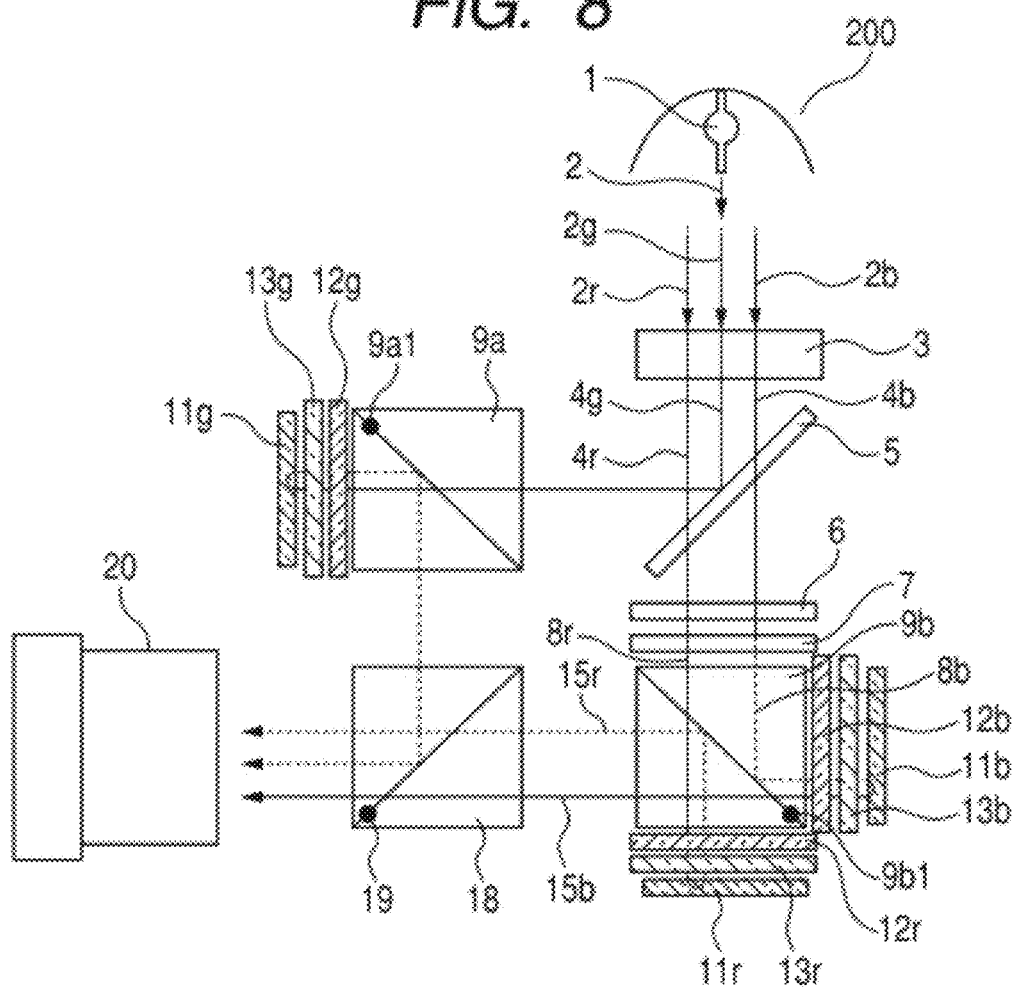
FIG. 8 is a schematic view illustrating a construction of a projection image display apparatus according to Embodiment 2 of the present invention.

Next, a projection image display apparatus according to Embodiment 2 of the present invention is described. FIG. 8 is a schematic view illustrating a construction of a projection image display apparatus 200 of Embodiment 2 of the present invention. The projection image display apparatus of Embodiment 2 includes, in addition to the construction of Embodiment 1, second retardation plates 13b, 13r, and 13g disposed between the retardation plates 12b, 12r, and 12g and the image display elements 11b, 11r, and 11g, respectively. The retardation plates 12b, 12r, and 12g are hereinafter referred to as first retardation plates while the retardation plates 13b, 13r, and 13g are hereinafter referred to as second retardation plates. It is to be noted that the construction is the same as that of the projection image display apparatus 100 of Embodiment 1 except for the above, and thus, description thereof is omitted.

In the following, effects of the first retardation plates 12b, 12r, and 12g and the second retardation plates 13b, 13r, and 13g are described.

Figure 9:
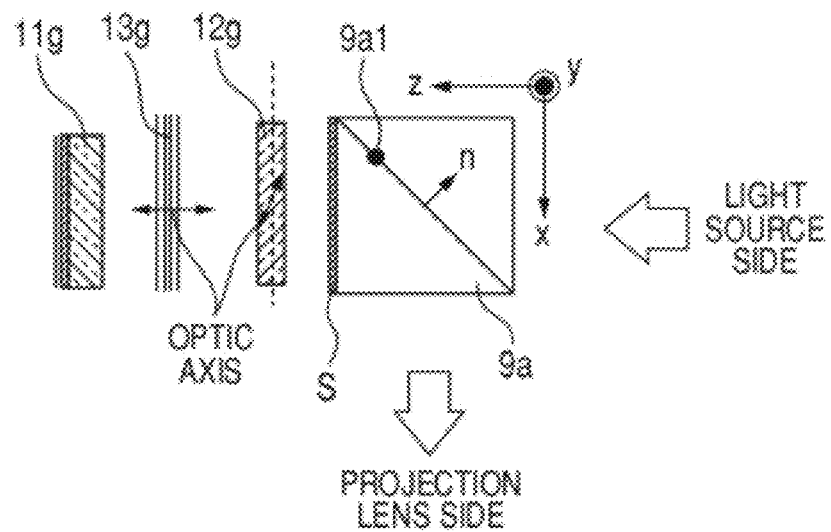
FIG. 9 is a schematic view illustrating disposition of elements in an optical path of green light of the projection image display apparatus according to Embodiment 2.

FIG. 9 is an enlarged view illustrating disposition of elements in the G optical path in FIG. 8. In FIG. 9, the construction is the same as that illustrated in FIG. 2 except for the second retardation plate 13g, and thus, description thereof is omitted. The second retardation plate 13g is disposed between the first retardation plate 12g and the image display element 11g and disposed in parallel with the light entering/exiting surface S (xy plane) of the image display element. The second retardation plate 13g does not have refractive index anisotropy in the optical surface of the retardation plate, and has an optic axis in the direction of a normal of the optical surface, that is, the retardation plate has different refractive indices with respect to the direction of the z axis and with respect to the direction in the xy plane.

Figure 10A:
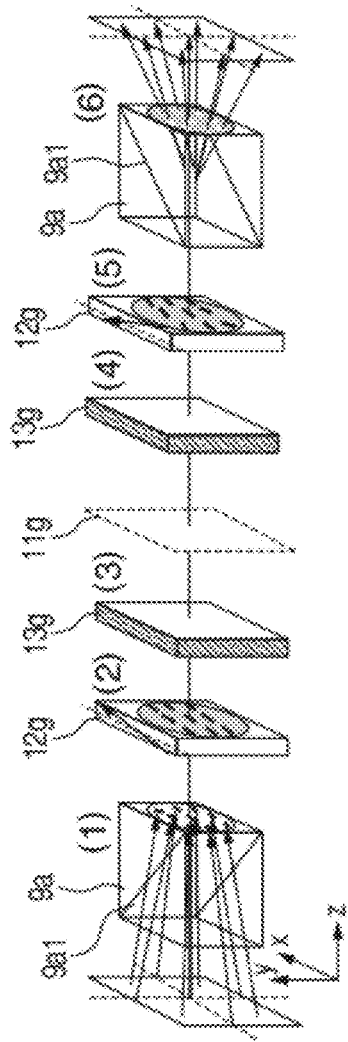
FIGS. 10A, 10B and 10C are schematic views illustrating change in a polarization state of light which passes through the elements according to Embodiment 2 of the present invention.
Figure 10B:
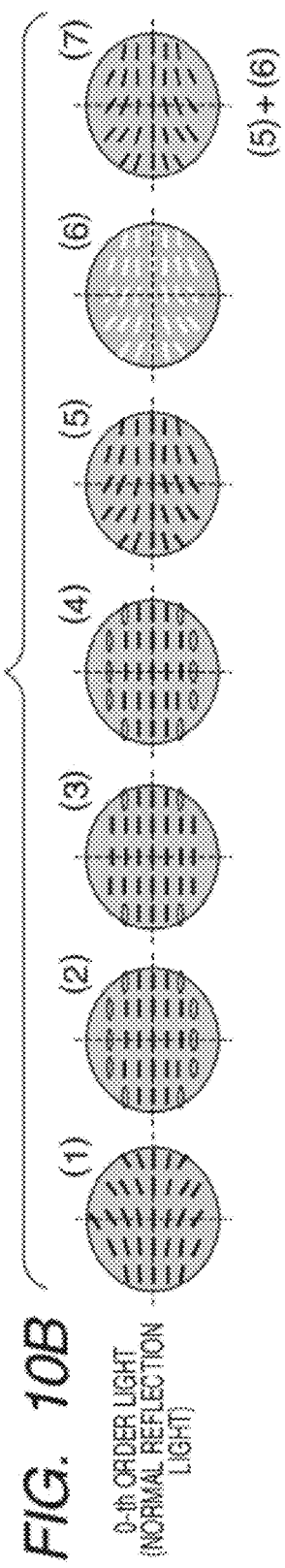
Figure 10C:
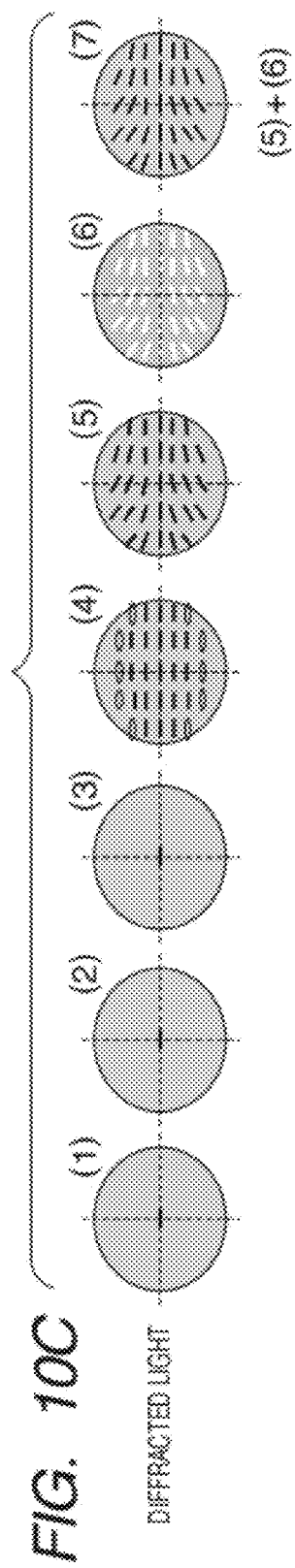

FIGS. 10A, 10B, and 10C schematically illustrate the relationship between the incident azimuth and the phase in the element construction of Embodiment 2 illustrated in FIG. 9, in which incident light passes through the polarizing beam splitter 9a, the first retardation plate 12g, the second retardation plate 13g, and the image display element 11g in the forward path and the backward path until being polarized and separated again by the polarizing beam splitter 9a. Schematic description of FIGS. 10A, 10B, and 10C is similar to that of FIGS. 3A, 3B, and 3C. FIGS. 10A, 10B, and 10C are different from FIGS. 3A, 3B, and 3C in that polarization states (3) and (4) after the light passes through the second retardation plate 13g are added, part (5) illustrates a polarization state after the light passes through the first retardation plate 12g in the forward path and the backward path, part (6) illustrates a polarization state when the light is polarized and separated by the polarizing beam splitter 9a, and part (7) is superposition of parts (5) and (6).

The second retardation plate 13g compensates for undercompensation or overcompensation especially in a high incident angle range. Because the extent of the phase difference caused by the first retardation plate 12g varies depending on the incident angle, it is generically not easy to make satisfactory phase compensation with respect to the whole incident angle range only by the first retardation plate 12g. Therefore, the second retardation plate 13g is disposed which does not give a phase difference to polarized light which vertically enters and gives a phase difference according larger as the incident angle increases. By combining the first retardation plate 12g and the second retardation plate 13g, a phase shift which is insufficient or excessive only by the first retardation plate 12g depending on the incident angle on the polarizing beam splitter 9a is compensated for, and greater phase compensating effects may be obtained.

It goes without saying that great phase compensating effects may also be obtained by the combination of the first and second retardation plates with respect to diffracted light generated when the light is reflected by the image display element 11g. When the image display element 11g disposed at the back is a display element formed of liquid crystal, liquid crystal molecules themselves have refractive index anisotropy, and different phase differences are caused depending on the incident angle.

Generally, the higher the incident angle is, the more the caused phase difference increases which greatly affects leak light. Since the second retardation plate 13g is an element which gives a phase difference according to the incident angle, the second retardation plate 13g is also effective in compensating for such variation in the phase difference caused by the image display element 11g with respect to the incident angle. More specifically, by appropriately selecting the amount of the phase difference of the second retardation plate 13g, both leak light due to the polarizing beam splitter 9a and phase difference caused by the image display element 11g are compensated for, and still higher contrast may be attained.

Here, it is necessary to select a difference ne−n0 in refractive index between an ordinary ray refractive index n0 and an extraordinary ray refractive index ne of the second retardation plate 13g such that the sign thereof is opposite to the sign of a difference in refractive index between an ordinary ray refractive index and an extraordinary ray refractive index in the liquid crystal molecules in the image display element. Further, it is preferred that the polarizing beam splitter 9a, the first retardation plate 12g, the second retardation plate 13g, and the image display element 11g be disposed in this order in the optical path from the light source. Still further, when the image display element 11g is a liquid crystal image display element of a type in which the liquid crystals are aligned vertically (vertical alignment (VA)) when displaying black, especially great phase compensating effects may be obtained, but the present invention is not limited thereto.

Figure 11:
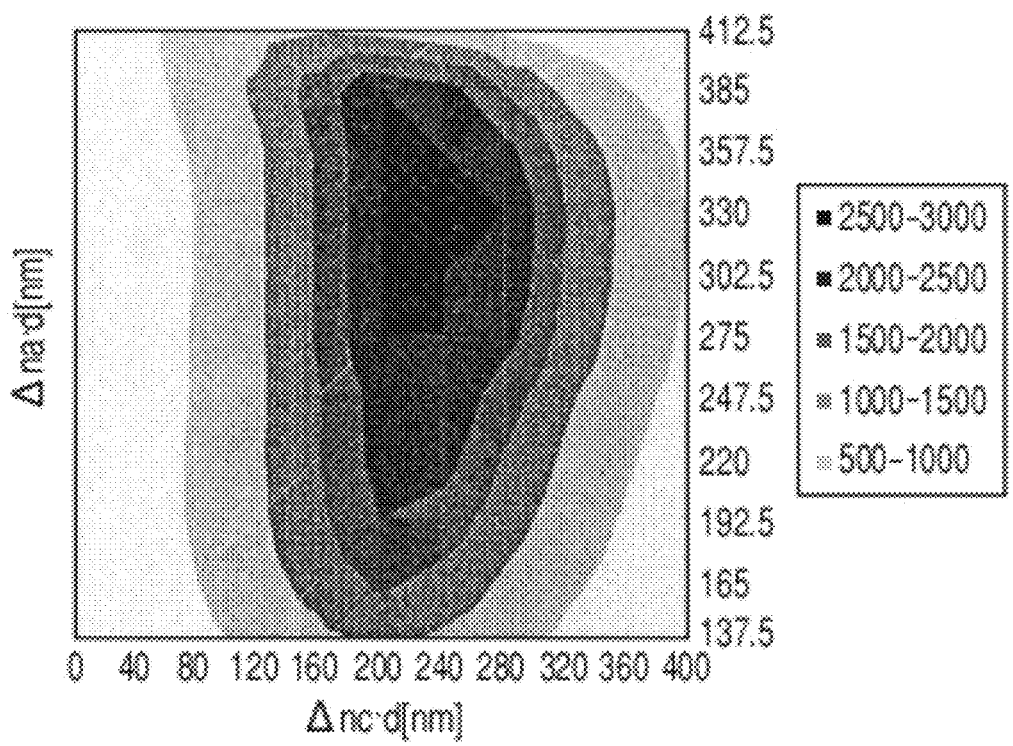
FIG. 11 illustrates correlation among a phase difference of a first retardation plate, a phase difference of a second retardation plate, and contrast.

FIG. 11 illustrates the correlation between the phase difference of the first retardation plate, the phase difference of the second retardation plate, and the contrast. The horizontal axis denotes a phase difference Δnc×d of the second retardation plate, while the vertical axis denotes the phase difference Δna×d of the first retardation plate. As the tone becomes darker, the contrast becomes higher. The tilt angle θAz of the optic axis of the first retardation plate is optimally set so as to obtain high contrast at the respective phase differences. By appropriately selecting the characteristics of the first and second retardation plates as illustrated in Table 2, a contrast of 3000:1 or higher may be attained and an image display apparatus which projects a high-quality image may be obtained. As described in the above, the second retardation plates 13b, 13r, and 13g further improves the phase compensating effects of the present invention, and, compared with the case of Embodiment 1, a projection image display apparatus which attains a higher contrast may be obtained.

Table 2 shows the characteristics of the first and second retardation plates in the G, B, and R optical paths, respectively, in Embodiment 2. The phase difference of the second retardation plate is calculated as $\Delta nc \times d$ where $\Delta nc$ is the difference $ne-n0$ in refractive index between the ordinary ray refractive index $n0$ and the extraordinary ray refractive index $ne$ of the second retardation plate and d is the length of the path along which polarized light that enters in parallel with the z axis passes through the second retardation plate. $\theta Cz$ is the angle formed between the optic axis of the second retardation plate and the z axis in FIG. 9. $\theta Cx$ is the angle formed between an image of the optic axis of the second retardation plate projected onto the xy plane and the x axis (the azimuth of the optic axis). The phase difference of the first retardation plate of Embodiment 2 is $0.5\lambda$ with respect to all the optical paths where $\lambda$ is the designed wavelength, which satisfies Expression (1). $\theta Az$ is 67 or 68 degrees, which satisfies Expression (2). $\theta Cz$ is 0 degree, which means that the optic axis of the second retardation plate is disposed in parallel with the z axis.

The first and second retardation plates having such characteristics may be formed by, for example, cutting out an anisotropic crystal such as sapphire or quartz diagonally with respect to a crystal axis. Alternatively, a phase difference film using liquid crystal orientation may be used, or a retardation plate using structural anisotropy of a fine periodic structure of the size of the wavelength or smaller may also be used. In particular, the second retardation plate may have a construction in which two or more kinds of inorganic isotropic thin films having different refractive indices are laminated. In this case, in order to obtain sufficient compensating effects, it is preferred that at least ten thin films be laminated. Such a construction may make integral the first and second retardation plates, and thus, an optical system which saves space may be materialized.

(Embodiment 3)

Figure 12:
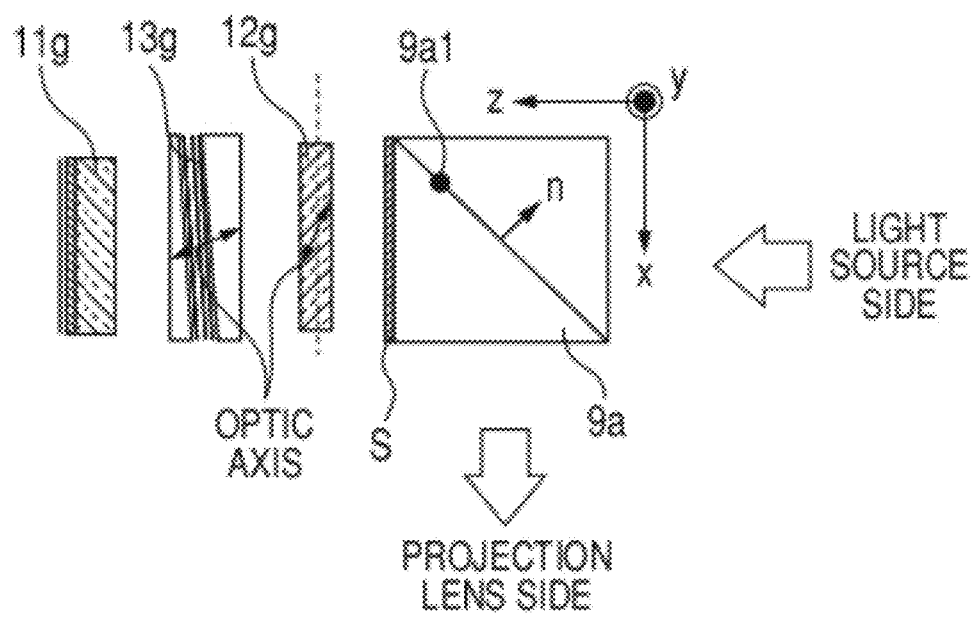
FIG. 12 is a schematic view illustrating disposition of elements in an optical path of green light of a projection image display apparatus according to Embodiment 3.

Next, a projection image display apparatus of Embodiment 3 of the present invention is described. The element construction of Embodiment 3 is the same as that of Embodiment 2, and thus, a schematic view illustrating a construction of the projection image display apparatus of Embodiment 3 is omitted. FIG. 12 is an enlarged view illustrating disposition of elements in the G optical path in Embodiment 3. While, in Embodiment 2, the optic axis of the second retardation plate 13g is disposed in parallel with the z axis, in the projection image display apparatus of Embodiment 3, the optic axis of the second retardation plate 13g is disposed tilted with respect to the z axis.

When the image display element 11g is a display element formed of liquid crystal, the liquid crystal molecules are tilted by a certain angle (pretilt angle) with respect to the z axis in FIG. 12 even in the black display state. Such orientation of the liquid crystal molecules causes an undesired phase shift in the image light, and, despite the black display state, leak light is caused when analysis is made by the polarizing beam splitter, which lowers the contrast. For such a phase shift, the second retardation plate 13g is disposed so that the optic axis of the second retardation plate 13g is tilted at the same tilt angle and the same tilt azimuth as those of the pretilt with respect to the z axis. Such disposition enables compensation for the phase shift caused by the pretilt of the liquid crystal, and at the same time, suppresses adverse effects of the first retardation plate 12g disposed upstream on the phase compensation by the polarizing beam splitter. More specifically, the phase shift caused by the polarizing beam splitter 9a is compensated for by the first retardation plate 12g while leak light caused by the pretilt of the liquid crystal is compensated for by the second retardation plate 13g. By compensating for the phase according to the characteristics of the phase shifts caused by the respective members, great phase compensating effects may be obtained by the apparatus as a whole.

In the present embodiment, the second retardation plate 13g itself having an optic axis in the direction of a normal of the optical surface of the retardation plate is disposed so as to be tilted with respect to the xy plane, and the optic axis is tilted with respect to the z axis. Further, in order to suppress astigmatism due to the disposition of the second retardation plate itself in tilted manner, the second retardation plate is interposed between wedge-shaped refractive index isotropic substrates. However, the present invention is not limited thereto, and, for example, a retardation plate having an optic axis tilted at a desired angle with respect to a surface normal to the optical surface of the retardation plate may be disposed in parallel with the xy plane.

In the present embodiment, it is preferred that the angle $\theta Cz$ (degree) formed between the optic axis of the second retardation plate 13g and the z axis be, as illustrated in Expression (3), in the range of 0 degree or more and 15 degrees or less, $$0 \leq \theta Cz \leq 15, \qquad (3)$$

where $\theta Cz$ is an acute angle.

The tilt angle $\theta Cz$ is determined by the phase difference of the second retardation plate and the pretilt angle. When $\theta Cz$ is 15 degrees or more, leak light except leak light caused by the pretilt increases. The angle distribution of the phase shift caused by the pretilt and the angle distribution of phase shift caused in the incident light by its oblique incident on the polarizing beam splitter 9a are different from each other in symmetry. Therefore, if $\theta Cz$ is made large, the asymmetry caused thereby affects the compensating effects of the polarizing beam splitter. By restricting $\theta Cz$ in the range expressed in Expression (3), leak light caused by the polarizing beam splitter and by the image display element may be satisfactorily compensated for, and great phase compensating effects may be obtained by the apparatus as a whole. The tilt azimuth of $\theta Cz$ may conform to the tilt angle and tilt azimuth of the pretilt of the liquid crystal.

Figure 13:
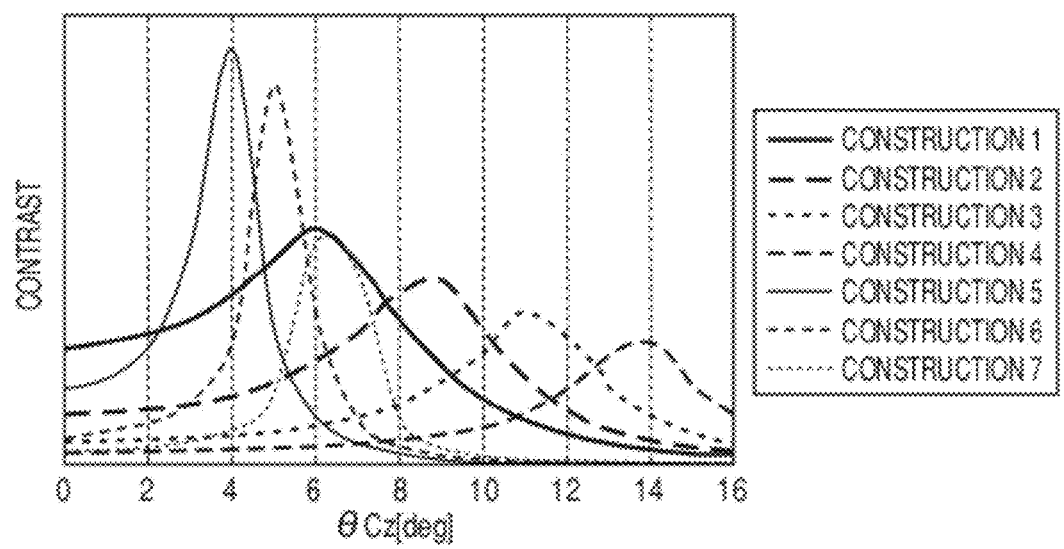
FIG. 13 illustrates correlation between a tilt angle θCz of a second retardation plate and contrast.

FIG. 13 illustrates the result of calculation of the contrast with respect to the tilt angle $\theta Cz$ of the second retardation plate with respect to the z axis. The horizontal axis denotes the tilt angle $\theta Cz$ of the second retardation plate with respect to the z axis, while the vertical axis denotes the contrast. Seven lines drawn in FIG. 13 correspond to seven conditions in which the refractive index of wedge-shaped substrates sandwiching the second retardation plate is 1.8 or 1.0 and the phase difference of the first retardation plate is changed in a range between $0.4\lambda$ and $0.6\lambda$. Other parameters are set to be optimal values. It may be seen that, although the tilt angle $\theta Cz$ which is optimal for each of the conditions depends on the disposition and construction of the elements, the tilt angle $\theta Cz$ of the second retardation plate which maximizes the contrast under each of the conditions is 15 degrees or less. If $\theta Cz$ is 15 degrees or more, the effects on the phase compensation on the side of the polarizing beam splitter increase to lower the contrast.

Table 3 shows the characteristics of the first and second retardation plates in the G, B, and R optical paths, respectively, in Embodiment 3 of the present invention. The phase differences of the first retardation plates of Embodiment 3 are $0.51\lambda$ in the G optical path, $0.56\lambda$ in the B optical path, and $0.53\lambda$ in the R optical path where $\lambda$ is the designed wavelength, all of which satisfy Expression (1). $\theta Ax$ is 67 or 68 degrees, which satisfies Expression (2). The tilt angle $\theta Cz$ of the second retardation plate is in the range of 4.4 to 4.6 degrees, which satisfies Expression (3). The azimuth $\theta Cx$ of the optic axis of the second retardation plate 13g is tilted by 45 degrees because the azimuth of the pretilt of the liquid crystal molecules is designed to be tilted by 45 degrees. Depending on the construction of the image display element formed of liquid crystal, θCx may conform to the tilt azimuth of the pretilt. The construction of Embodiment 3 may attain a contrast of 3000:1. Not only leak light caused by the polarizing beam splitter but also leak light caused by the pretilt angle of the liquid crystal is compensated for, and a projection image display apparatus which enables high contrast may be obtained.

(Embodiment 4)

Figure 14:
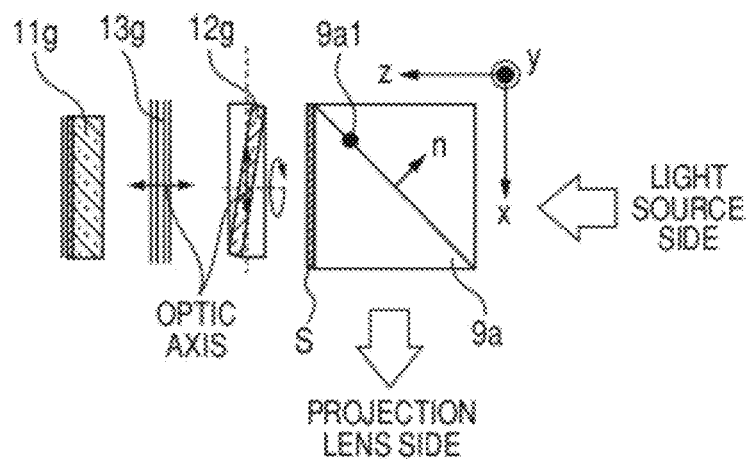
FIG. 14 is a schematic view illustrating disposition of elements in an optical path of green light of a projection image display apparatus according to Embodiment 4.

Next, a projection image display apparatus of Embodiment 4 is described. A schematic view illustrating a construction of the projection image display apparatus of Embodiment 4 is the same as that of Embodiment 2, and thus, is omitted. FIG. 14 is an enlarged view illustrating disposition of elements in the G optical path in the projection image display apparatus of Embodiment 4.

In Embodiment 3, the image display element 11g is formed of liquid crystal, and, when the liquid crystal molecules have a pretilt angle, the phase shift caused by the pretilt is compensated for by tilting the second retardation plate 13g in the same direction (angle and azimuth) as that of the pretilt. However, because, in the construction of Embodiment 3, the optic axis of the second retardation plate 13g is set to form an angle in the range of 0 to 15 degrees with a normal to the optical surface, when there is not enough space for tilting the second retardation plate 13g in the same direction as that of the pretilt, sufficient compensating effects may not be obtained.

In the construction of Embodiment 4, the first retardation plate 12g is disposed so as to be tilted with respect to the light entering/exiting surface S (xy plane) of the polarizing beam splitter. Further, in order to suppress astigmatism caused by disposing the first retardation plate 12g tilted, the light entering/exiting surfaces of the first retardation plate 12g are sandwiched between first and second wedge-shaped refractive index isotropic substrates. The first wedge-shaped substrate is on the side of the polarizing beam splitter of the first retardation plate 12g while the second wedge-shaped substrate is on the side of the image display element of the first retardation plate 12g. An optical surface of the first wedge-shaped substrate on the side of the polarizing beam splitter is in parallel with the xy plane, and an optical surface of the second wedge-shaped substrate on the side of the image display element is also in parallel with the xy plane. In this construction, by rotating the first retardation plate 12g about the z axis, in other words, by making the optic axis in a tilted state with respect to the x axis, the y axis, and the z axis, the phase shift caused by the pretilt of the liquid crystal is compensated for.

When the pretilt angle of the liquid crystal varies to some extent, in order to make optimal compensation for the phase shift, it is necessary to finely adjust the direction of the optic axis of the retardation plate which compensates for the phase shift caused by the pretilt after the manufacture thereof. In this case, in the construction of Embodiment 3, it is necessary to finely adjust the tilt angle of the second retardation plate with respect to the xy plane. However, it is difficult to perform the fine adjustments, and, when the tilt angle is changed by the fine adjustments, the optical surfaces of the wedge-shaped substrates are no longer in parallel with the xy plane, and thus, this is not realistic. On the other hand, in the present embodiment, the fine adjustments may be performed by finely adjusting the angle of rotation of the first retardation plate 12g, and satisfactory phase compensating effects may be obtained with a simpler construction. Rotation about the z axis makes the optic axis of the first retardation plate 12g not within the xz plane in FIG. 14, and thus, the compensating effects of the first retardation plate 12g for the polarizing beam splitter 9a are degraded to some extent. However, insofar as the amount of angular displacement of the optic axis from the xz plane is small, both compensation for the phase shift caused by the pretilt and the phase compensating effects for the polarizing beam splitter may be attained, and the phase compensating effects of the present invention may be sufficiently obtained.

Practically, it is preferred that the following expression be satisfied, $$0.5 \leq |\theta Ax| \leq 10 [\text{deg}], \quad (4)$$

where θAx is the angle formed between an image of the optic axis of the first retardation plate 12g projected onto the xy plane and the x axis (acute angle). It is more preferred that the following expression be satisfied.

$$1 \leq |\theta Ax| \leq 5 [\text{deg}] \quad (5)$$

The optimal angle of rotation depends on the phase difference of the retardation plate 12g and the tilt angle and tilt azimuth of the pretilt. However, when θAx is less than 0.5 degrees, the effects of compensating for the phase shift caused by the pretilt may not be obtained, and, when θAx is more than 10 degrees, the compensating effects for the polarizing beam splitter decrease, and enough phase compensating effects may not be obtained by the apparatus as a whole.

Table 4 shows the characteristics of the first and second retardation plates in the G, B, and R optical paths, respectively, in Embodiment 4 of the present invention. The phase difference of the first retardation plates of Embodiment 4 is 0.39λ where λ is the designed wavelength, which satisfies Expression (1). The absolute value of θAz is 79 or 80 degrees, which satisfies Expression (2). At the same time, the absolute value of θAx is in the range of 1.1 to 1.6 degrees, which satisfies Expression (5). θCz is 0 degree, which means that the optic axis of the second retardation plate is disposed in parallel with the z axis. The construction of Embodiment 4 may attain a contrast of 2300:1, and a projection image display apparatus which enables high contrast may be obtained.

In the construction of Embodiment 4, it is enough that the optic axis of the first retardation plate 12g is disposed within the optical surface of the first retardation plate 12g, and a retardation plate which is ordinarily used may be used as the first retardation plate, and thus, the effects of the present invention may be obtained with a simpler construction. It goes without speaking that effects similar to those described in the above may be obtained even when a retardation plate the optic axis of which is not in the optical surface as in Embodiment 1 or 2 and is tilted with respect to the surface S is rotated about the z axis in order to compensate for the phase shift caused by the pretilt. Further, the wedge-shaped substrates on both sides of the first retardation plate 12g in FIG. 14 may be integral with the polarizing beam splitter, or may be integral with the second retardation plate 13g. In such a case, the number of parts may be decreased to make the construction simpler.

(Embodiment 5)

A projection image display apparatus of Embodiment 5 is described. It is to be noted that the construction of the apparatus as a whole is substantially similar to those of the projection image display apparatus 100 illustrated in FIG. 1 and of the projection image display apparatus 200 illustrated in FIG. 8, and thus, a schematic view illustrating the construction of the apparatus as a whole is omitted. For the purpose of describing characteristic differences from the above embodiments, description is made with reference to FIG. 15 which illustrates disposition of elements in the G optical path, which is a representative of the optical paths.

Figure 15:
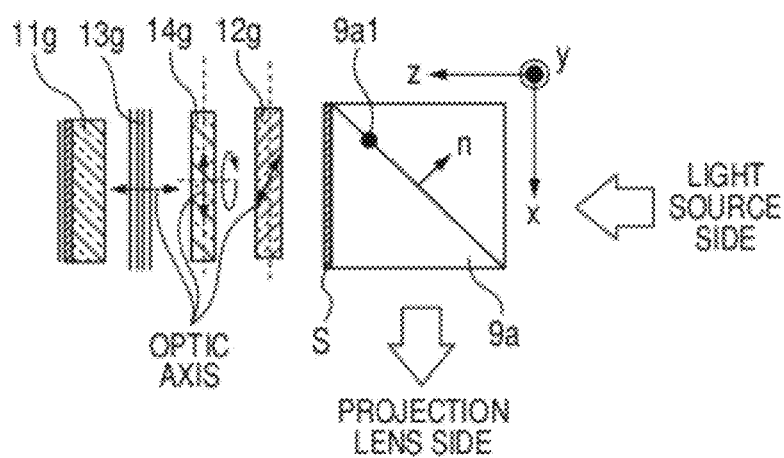
FIG. 15 is a schematic view illustrating disposition of elements in an optical path of green light of a projection image display apparatus according to Embodiment 5.

FIG. 15 is an enlarged view illustrating disposition of the elements in the G optical path in the projection image display apparatus of Embodiment 5. FIG. 15 is the same as FIG. 9 except for a third retardation plate 14g, and thus, description thereof is omitted. The projection image display apparatus of Embodiment 5 is characterized in that the third retardation plate 14g is disposed in the optical path. The retardation plate 12g, the retardation plate 13g, and the retardation plate 14g are hereinafter referred to as the first retardation plate, the second retardation plate, and the third retardation plate, respectively.

In the projection image display apparatus of Embodiment 5, the third retardation plate 14g is disposed between the first retardation plate 12g and the image display element 11g in parallel with the surface S (xy plane). The third retardation plate 14g has an anisotropic optical surface, and causes a phase difference in polarized light which enters in parallel with the z axis in FIG. 15. In the embodiment illustrated in FIG. 15, the third retardation plate 14g is disposed between the first retardation plate 12g and the second retardation plate 13g. However, the third retardation plate 14g may also be disposed between the second retardation plate 13g and the image display element 11g. In Embodiment 4, the first retardation plate 12g is used to compensate for the phase shift caused by the pretilt of the liquid crystal of the liquid crystal image display element 11g. In Embodiment 5, the third retardation plate 14g compensates for the phase shift caused by the pretilt.

In Embodiment 4, since the first retardation plate 12g is rotated about the z axis by a certain angle, the optic axis of the first retardation plate 12g is not in parallel with the xz plane. The variations in the polarization state caused by the polarizing beam splitter 9a are asymmetrical with respect to the y axis but are symmetrical with respect to the x axis. Therefore, by disposing the first retardation plate so that the optic axis of the first retardation plate is asymmetrical with respect to the x axis, the phase shift caused by the pretilt is compensated for, whereas leak light caused by the polarizing beam splitter increases. When an angle θa of rotation of the first retardation plate is small, the leak light may be suppressed to be small. However, when the pretilt angle is large, it is necessary to make larger the angle of rotation, which lowers the contrast of the apparatus as a whole.

In Embodiment 5, the third retardation plate 14g is disposed such that an image of its optic axis projected onto the xy plane is tilted by a certain angle about the z axis from a direction in parallel with or perpendicular to the y axis. Here, the first retardation plate 12g is disposed such that its optic axis is within the xz plane and is tilted with respect to the xy plane. Therefore, the first retardation plate 12g compensates for the phase shift caused by the polarizing beam splitter 9a, while the third retardation plate 14g compensates for the phase shift caused by the pretilt of the liquid crystal. In the construction of Embodiment 5, because the respective retardation plates may satisfactorily compensate for the respective kinds of leak light in this way, high contrast may be attained.

Figure 16:
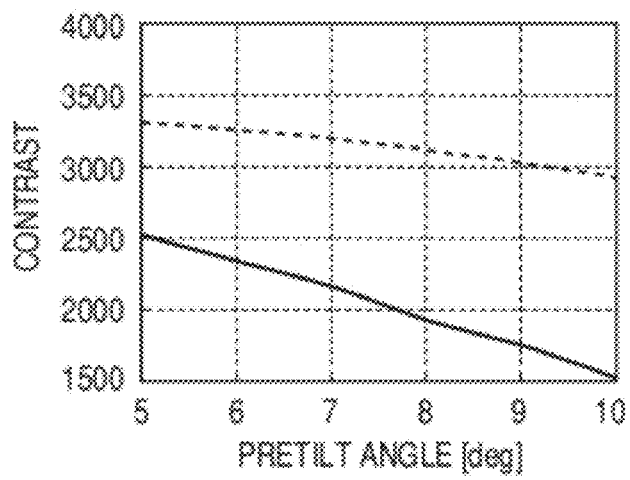
FIG. 16 illustrates correlation between a pretilt angle and contrast.

FIG. 16 is a graph of the contrast versus the pretilt angle with respect to Embodiment 4 (solid line) in which the phase shift caused by the pretilt is compensated for by the first retardation plate 12g and Embodiment 5 (broken line) in which the phase shift caused by the pretilt is compensated for by the third retardation plate 14g. It may be seen that, in Embodiment 5, not only the compensating effects themselves are great (the contrast is high), but also the contrast is not so degraded especially in a range in which the pretilt angle is large, and great compensating effects are exhibited. This is because, while, in Embodiment 4, by compensating for the phase shift caused by the pretilt by rotating the first retardation plate 12g about the z axis, the compensating effects for the polarizing beam splitter 9a decrease, in the present embodiment, by rotating the third retardation plate 14g and disposing the first retardation plate 12g in the same direction as in Embodiment 1, greater phase compensating effects may be obtained. It is preferred that θEx (degree) satisfy the following expression, $$0.5 \leq |\theta Ex| \leq 10 \text{ or } 0.5 \leq |\theta Ex - 90| \leq 10, \tag{6}$$

where θEx is an angle formed between the image of the optic axis of the third retardation plate 14g projected onto the xy plane and the x axis.

Further, it is preferred that a phase difference R' that the third retardation plate gives to two polarized light beams which enter in parallel with the z axis and which are orthogonal to each other satisfy the following expression, $$0.01\lambda \leq R' \leq 0.2\lambda, \tag{7}$$

where λ is a designed wavelength. The phase difference R' may be expressed as the product Δne×d of a difference Δne in refractive index between two polarized light beams which enter in parallel with the z axis and are orthogonal to each other and a length d of the path along which polarized light which enters in parallel with the z axis passes through the third retardation plate, and thus, it is preferred that the following expression be satisfied.

$$0.01\lambda \leq \Delta ne \times d \leq 0.2\lambda \tag{7}'$$

When the angle of rotation does not satisfy the condition of the lower limit of Expression (6), or, when the phase difference is smaller than the lower limit of Expression (7), because the phase difference is too small, the phase shift caused by the pretilt may not be substantially compensated for. When the angle of rotation does not satisfy the condition of the upper limit of Expression (6), or, when the phase difference is larger than the upper limit of Expression (7), the compensating effects of the first retardation plate 12g for the polarizing beam splitter are adversely affected. When the characteristics of the third retardation plate satisfy both of Expressions (6) and (7) simultaneously, the apparatus as a whole may obtain greater phase compensating effects.

Table 5 shows the characteristics of the first, second, and third retardation plates in the respective optical paths in Embodiment 5 of the present invention. θEz is the angle formed between the optic axis of the third retardation plate and the z axis, and θEx is the azimuth of the optic axis. The phase differences of the first retardation plates of Embodiment 5 are 0.57λ-0.65λ where λ is the designed wavelength, which satisfies Expression (1). θAx is 66 to 67 degrees, which satisfies Expression (2). Similarly, an angle of rotation θEx of the third retardation plate is 3.2 to 4.7 degrees and the phase difference is 0.060λ-0.062λ, which satisfies Expressions (6) and (7). The construction of Embodiment 5 may attain a contrast of 2800:1, and a projection image display apparatus which enables high contrast may be obtained.

Figure 17:
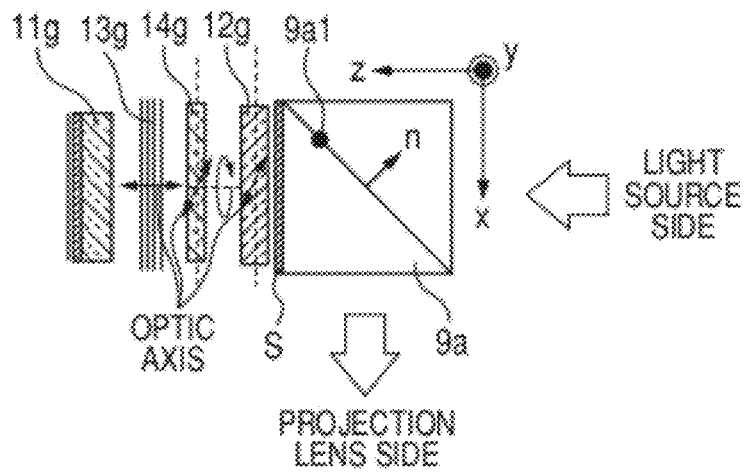
FIG. 17 is a schematic view illustrating disposition of elements in an optical path of green light of another construction of a projection image display apparatus according to Embodiment 5.

In the description of Embodiment 5, the third retardation plate 14g is described as a retardation plate having an optic axis within the xy plane. However, it is enough that the retardation plate causes a phase difference with respect to light which enters so as to be in parallel with the z axis, and thus, the present invention is not limited to the above embodiment. For example, effects similar to those described in the above may be obtained even when, as illustrated in FIG. 17, the optic axis of the third retardation plate 14g is tilted similarly to the first retardation plate 12g. Further, because the characteristics of the second retardation plate 13g remains the same even when the second retardation plate 13g is rotated about the z axis, the second retardation plate 13g may be disposed integrally with the third retardation plate 14g. In such a case, not only the number of parts may be decreased but also the manufacturing cost and space necessary for disposing the apparatus may be effectively reduced by providing commonality of the substrate.

Figure 18:
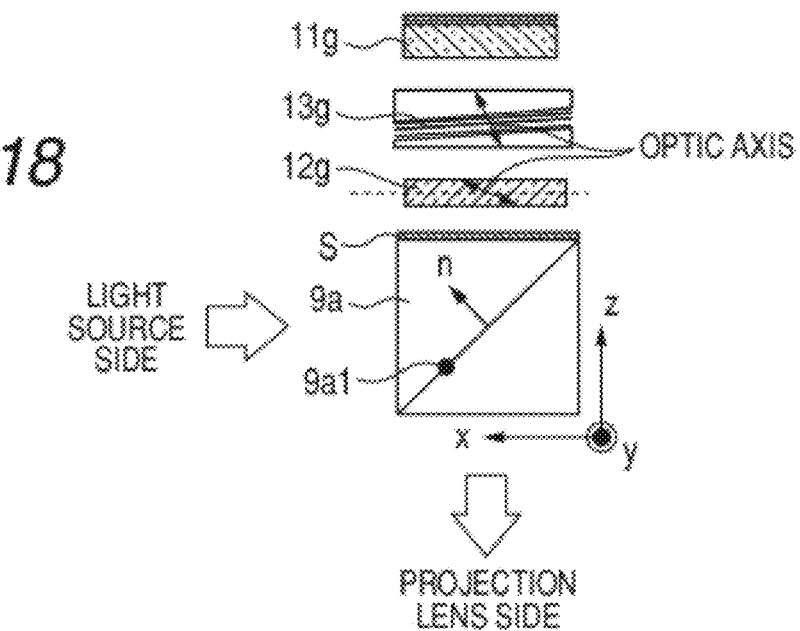
FIG. 18 is a schematic view illustrating a construction of a projection image display apparatus of the present invention when liquid crystal is disposed on a reflection side of a polarizing beam splitter.

Exemplary embodiments of the present invention are described in the above. However, the present invention is not limited thereto, and various variations and modifications are possible within the gist of the present invention. For example, in all of Embodiments 1 to 5, all of the optical elements are adapted to be disposed on the transmission side of the polarization and separation. However, the present invention is not limited thereto, and, as illustrated in FIG. 18, the elements may be disposed on the reflection side. Further, one image display apparatus and one polarizing beam splitter may achieve polarization and separation and image display without color separation.

As described in detail in the above, the present invention relates to a projection image display apparatus. According to the present invention, by providing conventionally difficult phase compensation for leak light caused by diffracted light generated by an image display element, high contrast may be attained. Further, lowering of the luminance by applying the present invention is suppressed to a minimum, and an image display apparatus which may attain both high luminance and high contrast and which projects a high-quality image may be provided. Further, the sensitivity of the intensity of diffracted light to the contrast may be relaxed, which may contribute to mass production, cost reduction, and the like.

TABLE 1

(a) Designed value of retardation plate of embodiment 1 in green light optical path

| | $\lambda$ = 550 nm Retardation plate |
|---|---|
| $\Delta na \times d$ | 275 nm |
| Optic axis angle $|\theta Az|$ (Tilt) | 67 deg |
| Optic axis azimuth $|\theta Ax|$ (Azimuth) | 0 deg |

Phase difference: 0.50$\lambda$ (b) Designed value of retardation plate of embodiment 1 in blue light optical path

| | $\lambda$ = 450 nm Retardation plate |
|---|---|
| $\Delta na \times d$ | 225 nm |
| Optic axis angle $|\theta Az|$ (Tilt) | 68 deg |
| Optic axis azimuth $|\theta Ax|$ (Azimuth) | 0 deg |

Phase difference: 0.50$\lambda$ (c) Designed value of retardation plate of embodiment 1 in red light optical path

| | $\lambda$ = 630 nm Retardation plate |
|---|---|
| $\Delta na \times d$ | 315 nm |
| Optic axis angle $|\theta Az|$ (Tilt) | 68 deg |

TABLE 1-continued

| Optic axis azimuth $|\theta Ax|$ (Azimuth) | 0 deg |
|---|---|

Phase difference: 0.50$\lambda$

TABLE 2

(a) Designed value of retardation plate of embodiment 2 in green light optical path

| | $\lambda$ = 550 nm First retardation plate | | $\lambda$ = 550 nm Second retardation plate |
|---|---|---|---|
| $\Delta na \times d$ | 275 nm | $\Delta nc \times d$ | 441 nm |
| Optic axis angle $|\theta Az|$ (Tilt) | 67 deg | Optic axis angle $|\theta Cz|$ (Tilt) | 0 deg |
| Optic axis azimuth $|\theta Ax|$ (Azimuth) | 0 deg | Optic axis azimuth $|\theta Cx|$ (Azimuth) | 0 deg |

Phase difference: 0.50$\lambda$ (b) Designed value of retardation plate of embodiment 2 in blue light optical path

| | $\lambda$ = 450 nm First retardation plate | | $\lambda$ = 450 nm Second retardation plate |
|---|---|---|---|
| $\Delta na \times d$ | 225 nm | $\Delta nc \times d$ | 437 nm |
| Optic axis angle $|\theta Az|$ (Tilt) | 67 deg | Optic axis angle $|\theta Cz|$ (Tilt) | 0 deg |
| Optic axis azimuth $|\theta Ax|$ (Azimuth) | 0 deg | Optic axis azimuth $|\theta Cx|$ (Azimuth) | 0 deg |

Phase difference: 0.50$\lambda$ (c) Designed value of retardation plate of embodiment 2 in red light optical path

| | $\lambda$ = 630 nm First retardation plate | | $\lambda$ = 630 nm Second retardation plate |
|---|---|---|---|
| $\Delta na \times d$ | 315 nm | $\Delta nc \times d$ | 445 nm |
| Optic axis angle $|\theta Az|$ (Tilt) | 68 deg | Optic axis angle $|\theta Cz|$ (Tilt) | 0 deg |
| Optic axis azimuth $|\theta Ax|$ (Azimuth) | 0 deg | Optic axis azimuth $|\theta Cx|$ (Azimuth) | 0 deg |

Phase difference: 0.50$\lambda$

TABLE 3

(a) Designed value of retardation plate of embodiment 3 in green light optical path

| | $\lambda$ = 550 nm First retardation plate | | Second retardation plate |
|---|---|---|---|
| $\Delta nc \times d$ | 279 nm | $\Delta nc \times d$ | 441 nm |
| Optic axis angle $|\theta Az|$ (Tilt) | 67 deg | Optic axis angle $|\theta Cz|$ (Tilt) | 4.5 deg |

TABLE 3-continued

| | | | |
|---|---|---|---|
| Optic axis azimuth \|θAx\| (Azimuth) | 0 deg | Optic axis azimuth \|θCx\| (Azimuth) | 45 deg |

Phase difference: 0.51λ

(b) Designed value of retardation plate of embodiment 3 in blue light optical path λ = 450 nm

| | First retardation plate | | Second retardation plate |
|---|---|---|---|
| Δna × d | 252 nm | Δnc × d | 437 nm |
| Optic axis angle \|θAz\| (Tilt) | 68 deg | Optic axis angle \|θCz\| (Tilt) | 4.6 deg |
| Optic axis azimuth \|θAx\| (Azimuth) | 0 deg | Optic axis azimuth \|θCx\| (Azimuth) | 45 deg |

Phase difference: 0.56λ

(c) Designed value of retardation plate of embodiment 3 in red light optical path λ = 630 nm

| | First retardation plate | | Second retardation plate |
|---|---|---|---|
| Δna × d | 333 nm | Δnc × d | 445 nm |
| Optic axis angle \|θAz\| (Tilt) | 67 deg | Optic axis angle \|θCz\| (Tilt) | 4.4 deg |
| Optic axis azimuth \|θAx\| (Azimuth) | 0 deg | Optic axis azimuth \|θCx\| (Azimuth) | 45 deg |

Phase difference: 0.53λ

TABLE 4

(a) Designed value of retardation plate of embodiment 4 in green light optical path λ = 550 nm

| | First retardation plate | | Second retardation plate |
|---|---|---|---|
| Δna × d | 212 nm | Δnc × d | 326 nm |
| Optic axis angle \|θAz\| (Tilt) | 79 deg | Optic axis angle \|θCz\| (Tilt) | 0 deg |
| Optic axis azimuth \|θAx\| (Azimuth) | 1.3 deg | Optic axis azimuth \|θCx\| (Azimuth) | 0 deg |

Phase difference: 0.39λ

(b) Designed value of retardation plate of embodiment 4 in blue light optical path λ = 450 nm

| | First retardation plate | | Second retardation plate |
|---|---|---|---|
| Δna × d | 175 nm | Δnc × d | 322 nm |
| Optic axis angle \|θAz\| (Tilt) | 80 deg | Optic axis angle \|θCz\| (Tilt) | 0 deg |
| Optic axis azimuth \|θAx\| (Azimuth) | 1.6 deg | Optic axis azimuth \|θCx\| (Azimuth) | 0 deg |

Phase difference: 0.39λ

(c) Designed value of retardation plate of embodiment 4 in red light optical path λ = 630 nm

| | First retardation plate | | Second retardation plate |
|---|---|---|---|
| Δna × d | 244 nm | Δnc × d | 303 nm |
| Optic axis angle \|θAz\| (Tilt) | 80 deg | Optic axis angle \|θCz\| (Tilt) | 0 deg |

TABLE 4-continued

| | | | |
|---|---|---|---|
| Optic axis azimuth \|θAx\| (Azimuth) | 1.1 deg | Optic axis azimuth \|θCx\| (Azimuth) | 0 deg |

Phase difference: 0.39λ

TABLE 5

(a)

λ = 550 nm

| | First retardation plate | | Second retardation plate |
|---|---|---|---|
| Δna × d | 359 nm | Δnc × d | 441 nm |
| Optic axis angle \|θAz\| (Tilt) | 66.5 deg | Optic axis angle \|θCz\| (Tilt) | 0 deg |
| Optic axis azimuth \|θAx\| (Azimuth) | 0 deg | Optic axis azimuth \|θCx\| (Azimuth) | 0 deg |

Phase difference: 0.65λ

| | Third retardation plate |
|---|---|
| Δna × d | 34 nm |
| Optic axis angle \|θEz\| (Tilt) | 0 deg |
| Optic axis azimuth \|θEx\| (Azimuth) | 3.6 deg |

Phase difference: 0.062λ

(b)

λ = 450 nm

| | First retardation plate | | Second retardation plate |
|---|---|---|---|
| Δna × d | 265 nm | Δnc × d | 391 nm |
| Optic axis angle \|θAz\| (Tilt) | 66 deg | Optic axis angle \|θCz\| (Tilt) | 0 deg |
| Optic axis azimuth \|θAx\| (Azimuth) | 0 deg | Optic axis azimuth \|θCx\| (Azimuth) | 0 deg |

Phase difference: 0.59λ

| | Third retardation plate |
|---|---|
| Δna × d | 28 nm |
| Optic axis angle \|θEz\| (Tilt) | 0 deg |
| Optic axis azimuth \|θEx\| (Azimuth) | 4.7 deg |

Phase difference: 0.062λ

(c)

λ = 630 nm

| | First retardation plate | | Second retardation plate |
|---|---|---|---|
| Δna × d | 356 nm | Δnc × d | 428 nm |
| Optic axis angle \|θAz\| (Tilt) | 67 deg | Optic axis angle \|θCz\| (Tilt) | 0 deg |
| Optic axis azimuth \|θAx\| (Azimuth) | 0 deg | Optic axis azimuth \|θCx\| (Azimuth) | 0 deg |

Phase difference: 0.57λ

| | Third retardation plate |
|---|---|
| Δne × d | 38 nm |
| Optic axis angle \|θEz\| (Tilt) | 0 deg |

TABLE 5-continued

Optic axis azimuth |θEx| (Azimuth)  3.2 deg
Phase difference: 0.060λ

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-178899, filed Jul. 31, 2009, which is hereby incorporated by reference herein in its entirety.

What is claimed is:

1. A projection image display apparatus, comprising:
    a light source;
    a polarizing beam splitter having a polarizing beam splitting surface through which one polarized light in incident light passes and which reflects the other polarized light in the incident light which is orthogonal to the one polarized light;
    an image display element for modulating the incident light into image light and reflecting the image light;
    a first retardation plate disposed between the polarizing beam splitter and the image display element; and
    a projection lens for projecting the image light onto a screen, wherein:
    the first retardation plate has refractive indices different from each other between two directions orthogonal to each other in an optical surface of the first retardation plate, and gives a phase difference which is larger than λ/4 to polarized light which vertically enters the optical surface and has a wavelength λ in a used wavelength band; and
    when coordinate axes are defined so that a direction of a normal to a light entering/exiting surface of the polarizing beam splitter is a z axis, a direction which is perpendicular both to the z axis and to a normal to the polarizing beam splitting surface is a y axis, and a direction which is perpendicular both to the z axis and to the y axis is an x axis, the first retardation plate has an optic axis which is within an xz plane and is tilted with respect to the x axis.

2. A projection image display apparatus according to claim 1, wherein the first retardation plate causes a phase difference R between two polarized light beams which enter the first retardation plate in parallel with the z axis and are orthogonal to each other, the phase difference R satisfying the following expression, $$0.3\lambda \leq R \leq 0.7\lambda,$$

where λ is a designed wavelength.

3. A projection image display apparatus according to claim 1, wherein the following expression is satisfied, $$60 \leq \theta Az \leq 85,$$

where θAz represents an acute angle in degrees formed between the optic axis of the first retardation plate and the z axis.

4. A projection image display apparatus according to claim 1, wherein:
    the optic axis of the first retardation plate is within the optical surface of the first retardation plate;
    the first retardation plate is disposed so that the optical surface is tilted with respect to an xy plane;
    the first retardation plate is interposed between a first wedge-shaped substrate on a side of the polarizing beam splitter and a second wedge-shaped substrate on a side of the image display element;
    the first wedge-shaped substrate and the second wedge-shaped substrate are refractive index isotropic;
    the first wedge-shaped substrate has an optical surface on the side of the polarizing beam splitter, which is in parallel with the xy plane; and
    the second wedge-shaped substrate has an optical surface on the side of the image display element, which is in parallel with the xy plane.

5. A projection image display apparatus according to claim 1, further comprising a second retardation plate, wherein:
    the second retardation plate has refractive indices different from each other between in a direction of the z axis and in a direction in the xy plane; and
    the polarizing beam splitter, the first retardation plate, the second retardation plate, and the image display element are disposed in the stated order from the light source in an optical path.

6. A projection image display apparatus according to claim 5, wherein a sign of a difference ne−n0 in refractive index between an ordinary ray refractive index n0 and an extraordinary ray refractive index ne of the second retardation plate is opposite to a sign of a difference in refractive index between an ordinary ray refractive index and an extraordinary ray refractive index in the image display element.

7. A projection image display apparatus according to claim 5, wherein the second retardation plate has a structure in which at least two kinds of inorganic isotropic thin films having different refractive indices are laminated by ten or more layers.

8. A projection image display apparatus according to claim 5, wherein the following expression is satisfied, $$0 \leq \theta Cz \leq 15,$$

where θCz represents an acute angle in degrees formed between the optic axis of the second retardation plate and the z axis.

9. A projection image display apparatus, comprising:
    a light source;
    a polarizing beam splitter having a polarizing beam splitting surface through which one polarized light in incident light passes and which reflects the other polarized light in the incident light which is orthogonal to the one polarized light;
    an image display element for modulating the incident light into image light and reflecting the image light;
    a first retardation plate disposed between the polarizing beam splitter and the image display element; and
    a projection lens for projecting the image light onto a screen, wherein
    the first retardation plate has different refractive indices with respect to two directions which are orthogonal to each other in an optical surface of the first retardation plate, and gives a phase difference which is larger than λ/4 to light which vertically enters the optical surface and has a wavelength λ in a used wavelength band; and
    when coordinate axes are defined so that a direction of a normal to a light entering/exiting surface of the polarizing beam splitter is a z axis, a direction which is perpendicular both to the z axis and to a normal to the polarizing beam splitting surface is a y axis, and a direction which is perpendicular both to the z axis and to the y axis is an x axis, the first retardation plate has an optic axis which is tilted with respect to the x axis, the y axis, and the z axis.

10. A projection image display apparatus according to claim 9, wherein the following expression is satisfied, $$0.5 \leq |\theta Ax| \leq 10,$$

where θAx is an acute angle in degrees formed between an image of the optic axis of the first retardation plate projected onto an xy plane and the x axis.

11. A projection image display apparatus according to claim 1, further comprising a third retardation plate, wherein:
   the third retardation plate is disposed between the first retardation plate and the image display element and has refractive indices different from each other between in two directions which are orthogonal to each other in an xy plane of the third retardation plate; and
   the third retardation plate is disposed so that an image of an optic axis of the third retardation plate projected onto the xy plane is rotated about the z axis from a direction in parallel with one of the x axis and the y axis.

12. A projection image display apparatus according to claim 11, wherein one of the following expressions is satisfied:

$$0.5 \leq |\theta Ex| \leq 10; \text{ and}$$

$$0.5 \leq |\theta Ex - 90| \leq 10,$$

where θEx is an acute angle in degrees formed between the image of the optic axis of the third retardation plate projected onto the xy plane and the x axis.

13. A projection image display apparatus according to claim 11, wherein the third retardation plate causes a phase difference R' between two polarized light beams which enter the third retardation plate in parallel with the z axis and are orthogonal to each other, the phase difference R' satisfying the following expression, $$0.01\lambda \leq R' \leq 0.2\lambda,$$

where λ is a designed wavelength.

14. A projection image display apparatus according to claim 1, wherein the polarizing beam splitter comprises a MacNeille type PBS.

15. A projection image display apparatus according to claim 1, wherein:
   the image display element comprises a liquid crystal image display element of a vertical alignment (VA) type; and
   the liquid crystal image display element has a pretilt angle with respect to a surface normal thereof in a black display state.

* * * * *